Nov. 17, 1964 J. H. BURNS 3,157,867

TAPE HANDLING APPARATUS

Filed July 18, 1958 10 Sheets-Sheet 1

INVENTOR
JOHN H. BURNS

BY Louis A. Kline
Albert L. Sessler, Jr.
HIS ATTORNEYS

Nov. 17, 1964 J. H. BURNS 3,157,867

TAPE HANDLING APPARATUS

Filed July 18, 1958 10 Sheets-Sheet 2

INVENTOR
JOHN H. BURNS

BY Louis A. Kline
Albert L. Sessler, Jr.
HIS ATTORNEYS

INVENTOR
JOHN H. BURNS
BY Louis A Kline
Albert L. Sessler, Jr.
HIS ATTORNEYS

Nov. 17, 1964 J. H. BURNS 3,157,867

TAPE HANDLING APPARATUS

Filed July 18, 1958 10 Sheets-Sheet 4

INVENTOR
JOHN H. BURNS

BY Louis A Kline
Albert L. Sessler, Jr.
HIS ATTORNEYS

INVENTOR
JOHN H. BURNS
BY Louis A. Kline
Albert L. Sessler, Jr.
HIS ATTORNEYS

TAPE HANDLING APPARATUS

Filed July 18, 1958 10 Sheets-Sheet 6

INVENTOR
JOHN H. BURNS
BY Louis A. Kline
Albert L. Seesler Jr.
HIS ATTORNEYS

Nov. 17, 1964 | J. H. BURNS | 3,157,867

TAPE HANDLING APPARATUS

Filed July 18, 1958 | 10 Sheets-Sheet 7

INVENTOR
JOHN H. BURNS

BY Louis A Kline
Albert L. Sessler, Jr.
HIS ATTORNEYS

Nov. 17, 1964 J. H. BURNS 3,157,867

TAPE HANDLING APPARATUS

Filed July 18, 1958 10 Sheets-Sheet 8

INVENTOR
JOHN H. BURNS

BY Louis A. Kline
Albert L. Sessler, Jr.
HIS ATTORNEYS

Nov. 17, 1964 J. H. BURNS 3,157,867

TAPE HANDLING APPARATUS

Filed July 18, 1958 10 Sheets-Sheet 9

INVENTOR
JOHN H. BURNS

BY Louis A. Kline
Albert L. Sessler, Jr.
HIS ATTORNEYS

INVENTOR
JOHN H. BURNS
BY Louis A Kline
Albert L. Sessler, Jr.
HIS ATTORNEYS

United States Patent Office 3,157,867

Patented Nov. 17, 1964

3,157,867

TAPE HANDLING APPARATUS

John H. Burns, Dayton, Ohio, assignor to The National Cash Register Company, Dayton, Ohio, a corporation of Maryland Filed July 18, 1958, Ser. No. 749,537
22 Claims. (Cl. 340—174.1)

The present invention relates generally to high-speed record tape handlers, and more particularly to electronic circuits for reading the tape and for controlling a tape-passing mechanism.

The record tape may be produced by a tape perforator or as a by-product of the operation of a business machine. In the latter case, the tape is encoded with information indicative of business transactions, and ordinarily, at the close of the business day the tapes are gathered from the various machines for processing at a central station. The central station includes a utilizing device such as a tape-to-card converter or a computer for assimilating the large amount of tape-carried information for sorting and/or storage. The computer then becomes a source of information for inventory purposes, merchandising, cost control, or other analyses.

Computer time is valuable whether on a leased or owned basis, so it is highly desirable that the tape information be "read" into the computer at a high rate. The computer generally accepts the input data in discrete portions, commonly known as frames, which frames are terminated by tape-carried end-of-frame signals. Each frame may represent a complete business transaction, successive frames being of the same or different lengths, as determined by the amount of information comprised in a transaction. The information is stored on the tape in the form of punched holes, different combinations of the holes signifying different digits or characters. Illustratively, a paper tape employing a two-of-six code will be used in the ensuing description. The invention in principle, however, is applicable to the handling of other types of record tapes, such as magnetic tape, encoded as desired. A two-of-six code requires six separate channels longitudinally of the tape. A signal indicative of any digit or character then is denoted by the presence of two holes, located in different channels in transverse alinement with respect to the tape length. By way of nomenclature, a single hole is indicative of a bit, and the electrical variation produced therefrom is a bit output. The end-of-frame signal may be a particular combination of two holes in the manner of the digits.

The tape-carried information is read into the computer as the tape is moved relative to a reading station. Computers generally accept a frame of data at a time, dwelling between frames to digest the discrete portions of information. The computer is responsive to the end-of-frame signals to arrest the tape motion at least long enough to treat the data in the manner prescribed by the computer program. Once this is accomplished, the computer generates a read-tape signal, which causes the tape motion to be resumed to enter the next frame. In this sense the tape motion is intermittent, and for this reason the transfer of information from the tape to the computer in the least time poses many perplexing problems.

It is desirable that the data be arranged as compactly as possible along the tape, so that the tape length per unit of data will be minimized. This feature, however, compromises the function of tape arresting, because it reduces the tape space available for stopping. The above features also complicate the problems of high-speed handling of the tape.

The foregoing problems are greatly relieved by an invention of Cebern B. Trimble, which is the subject matter of United States patent application Serial No. 459,476, filed on September 30, 1954, now United States Patent No. 2,864,609, issued December 16, 1958. The invention of the identified application employs a continuously-operating driving means generally in the form of a capstan, with which the tape is yieldably engaged to be moved along a path through a reading station, and further employs a brake, which normally lightly engages the tape in a pre-loading manner, but can be operated to grip the tape to arrest the motion thereof promptly, the drive yielding at this time.

The present invention utilizes a similar driving and braking arrangement, but adds thereto novel electronic controls which enable the use of higher tape speeds than were heretofore known. By way of example, the subject invention has established tape handling with accurate reading and control thereof, at the rate of 700 to 1,000 characters per second, without reaching any upper limit. The tape lineal velocity is between 70 inches and 100 inches per second for these reading speeds, with $\frac{1}{10}$-inch center spacing between adjacent bit holes.

Tape velocities of this order inherently influence the equilibrium of the tape passing through the reading station, developing slight skewing or "flutter" tendencies in the moving tape. Since ordinarily two data bit holes must be read simultaneously to produce a character signal, any irregular movement of the tape at the reading station could cause an erroneous signal. This is particularly true in electronic circuits where timing is critical and data handling rapid.

The subject invention alleviates this problem by retiming each data bit signal as derived from the tape to provide simultaneous bit outputs. The timing is accomplished through the use of a clock circuit which develops a clock wave from uniformly spaced sprocket apertures forming a clock channel on the tape.

In a typical tape, the center-to-center spacing of the sprocket holes is 0.1 inch, the same as the spacing of successive bit holes, but the diameter of the sprocket holes is 0.046 inch, compared to a bit hole diameter of 0.072 inch.

When the sprocket holes are read photo-electrically through a reading aperture of approximately 0.072 inch diameter, the developed clock wave is nearly sinusoidal. Also, one complete cycle of the clock wave occupies the same time-interval as one data bit signal, the latter appearing as a positive pulse and the former eventually as a square wave. However, the two waves are intentionally, temporally displaced for timing purposes. This is achieved at the reading station, which includes a mask apertured for each channel. The data bit mask apertures are in transverse alinement with respect to the tape at the reading station, but the clock aperture of the mask is displaced approximately one half of a bit hole diameter ahead of the alined data bit mask apertures in the direction of tape progression, all apertures being of the bit hole size.

The mask causes a data bit signal rise prior to the corresponding clock wave rise, but the latter wave falls about the same time as the data bit signal, due to the smaller size of the clock holes.

The leading edge or rise of the clock wave is caused to occur about the time that the associated data bit signals obtain a maximum value. The data bit signals and the clock wave are squared, and then the clock wave is differentiated to provide useful negative-going spikes, hereinafter called data sync clock pulses or signals. The data sync clock pulses are derived from the leading edges (rises) of the clock wave and so occur about the middle of the bit signals.

A gating circuit and a bistable state circuit cooperate to produce the retimed data bit signals. The original squared data bit signals and the negative-going data sync clock pulses are applied to the gating circuit. A coincidence of these two inputs at the gating circuit causes a reversal of the bistable state circuit at the time of occurrence of the data sync clock pulse. The retimed data bit output is thus derived from the bistable state circuit.

Since the data sync clock pulses which are applied to the gating circuit are derived from the rises of the tape clock wave, the data bit signals are retimed to the clock. One data bit signal occupies the time interval of one clock cycle. A single data bit signal rises during the rise of the clock wave, remains at its maximum amplitude during the next fall of the clock wave, and then falls when the clock wave rises. In the case of two or more adjacent data bit signals, the output assumes the well-known block form, the bistable state circuit remaining in the same condition as long as adjacent bit signals are present. The data bit signal fall is then caused when the associated data sync clock pulse influences the bistable state circuit.

Means are also provided in the present invention for checking the number of data bit signals generated by the various data reading circuits corresponding to the data channels on the tape at any given position of the tape. Since the code employed in the illustrative embodiment of the invention is a two-of-six code, it is obvious that when any number of data bit signals other than two is generated at any given position of the tape, an error has been made, either in perforation of the tape, or in reading. In the language checking circuit, the number of data bit signals produced at each character position of the tape is ascertained, and a signal which varies according to whether or not the correct number of data bits is present is combined in a gating circuit with a timing pulse produced by the clock circuit to develop an error signal in the event that an incorrect number of data bits are present. This error signal may be applied to the utilizing device to initiate a lock-up or other action, or it may be otherwise employed, if desired.

The high-speed brake employed in the present invention is operated by a circuit providing for high initial current for rapid energization of the brake coil, with the current dropping off subsequently to the lower value required to maintain the brake coil in energized condition. The operating circuit may be controlled directly by the utilizing device, or may be controlled by a brake control circuit which causes frame-by-frame reading of the tape, with predetermined, selectively variable time delays between reading intervals.

With the foregoing in mind, an object of the present invention is to provide an apparatus for reading perforated tape or other media, which is fast and efficient in operation.

A further object of the invention is to provide tape-handling apparatus in which data signals are retimed by regular clock signals to eliminate erroneous signals which could otherwise arise from skewing or flutter of the tape.

An additional object is to produce a device in which simultaneous data bit signals are produced by retiming each data bit signal with reference to a clock signal.

Another object is to provide tape-handling apparatus having sensing means capable of temporarily displacing one type of tape-carried information from another, the two types of information being located in the same relative position on the tape.

Still a further object is to provide a reading device for tape-handling apparatus in which sensing means for generating a timing pulse is physically displaced with respect to other sensing means for generating data bit signals.

Still another object is to provide a signal-checking device having means for producing an error signal in the event that an incorrect number of data bit signals are produced at any character position on the medium being sensed.

Another object is to provide tape-handling apparatus in which a clock signal and data bit signals are produced by sensing of the media being read, and in which a lack of coincidence between the clock signal and the required data bit signals will produce an error signal.

A further object is to provide reading apparatus including a brake for controlling movement of the tape, and in which novel means are provided capable of controlling the brake for frame-by-frame reading of information-bearing media, with a predermined time delay between reading intervals.

An additional object is to provide tape-handling apparatus including a brake and novel means for causing the brake to operate when a predetermined code is sensed on the tape.

Still a further object is to provide tape-handling apparatus including a brake for controlling movement of the tape, and also including means responsive to a tape-generated signal for stopping the tape, said means locking the brake in operated position if the tape has not been properly halted.

With these and incidental objects in view, the invention includes certain novel features of construction and combinations of parts, a preferred form or embodiment of which is herinafter described with reference to the drawings which accompany and form a part of this specification.

GENERAL DESCRIPTION

Figure 7:
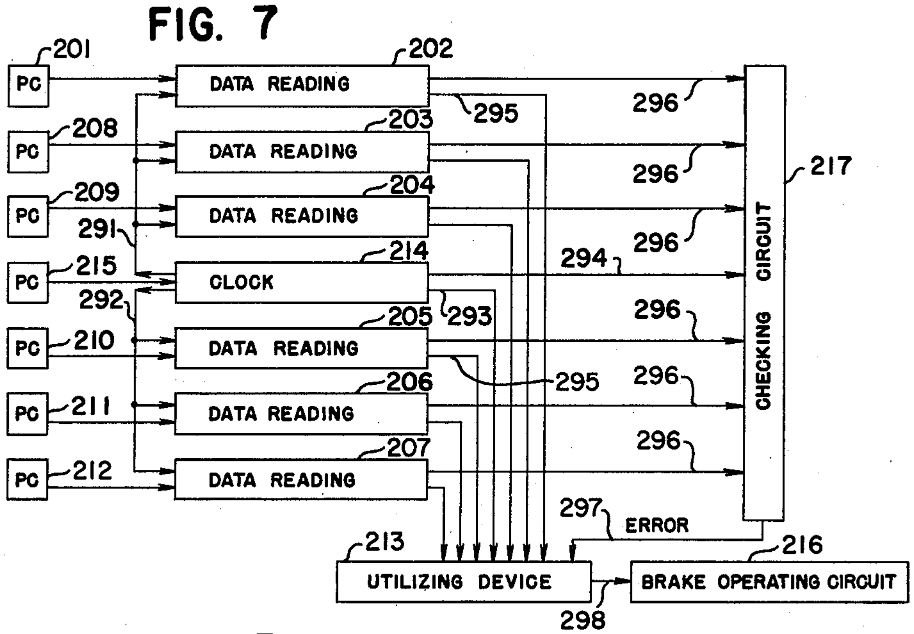
FIGS. 7 and 7A are block diagrams showing alternative arrangements of the various individual components of the apparatus of the present invention, and their relationship to each other.
Figure 7A:
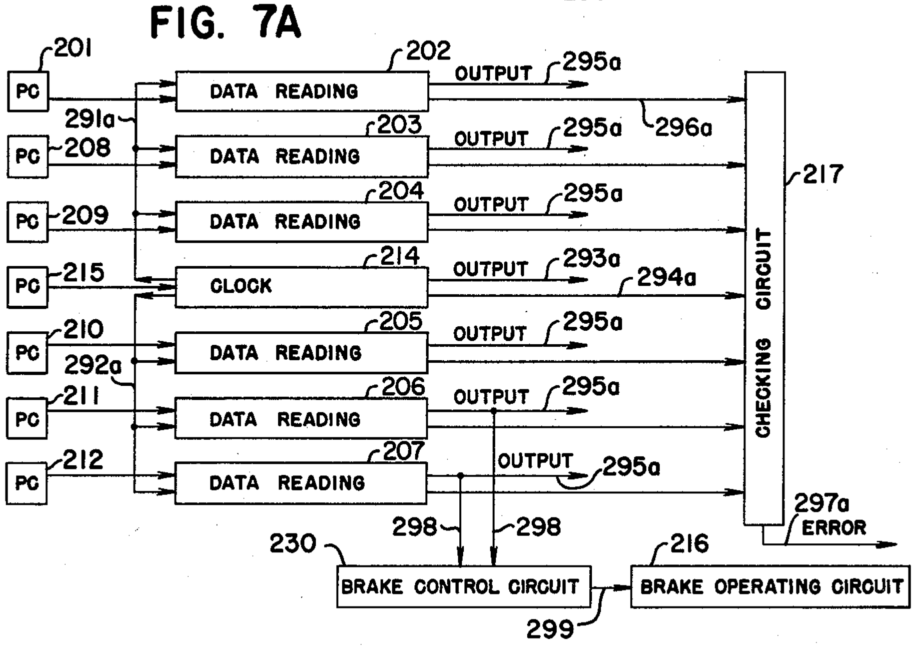

FIGS. 7 and 7A depict in block form suitable arrangements of the components to achieve retimed output data signals associated with a clock wave. Provisions are also included for language checking and the operation of a tape brake, the latter preferably under control of a utilizing device.

Figure 6:
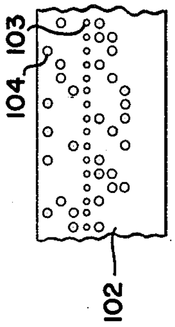
FIG. 6 shows a fragment of a typical perforated tape suitable for reading by the apparatus of the present invention.

Considering first FIG. 7, the photocell pickup for channel 1 of the record tape 102 (FIG. 6) is represented by the block 201, bearing the notation PC. The photocell 201 and the block 202, marked DATA READING, are shown in circuit detail in FIG. 10, to be described later. Five other identical DATA READING blocks, consecutively numbered from 203 to 207 inclusive, are shown with individual input photocell blocks 208 to 212 inclusive.

The blocks 201 and 202 represent the data-reading circuitry for channel 1 of the record tape, being capable of converting the punched hole data into electrical data bit signals. As was mentioned earlier, the two-of-six code is illustratively employed, so that a coincidence of two data bit signals is required to represent data. Hence, data bit signals simultaneously appear at the outputs of any two of the DATA READING blocks for application over paths 295 to a UTILIZING DEVICE 213.

Also, a clock signal, as developed in the block 214, marked CLOCK, from the sprocket holes 103 of the record tape 102, as picked up by the photocell 215, is applied to the UTILIZING DEVICE 213 over a path 293 in timed relation with the data bit signals. The timing is accomplished in the DATA READING circuits, where the data bit signals are retimed relative to the uniform clock wave. The retiming is effected by data sync clock signals derived from the clock wave and applied to each of the DATA READING blocks over paths 291 and 292, as shown in FIG. 7. The clock channel circuitry is detailed in FIG. 9.

A certain coded symbol, called the end-of-frame signal, may be carried by the record tape, and the holes indicative thereof are simultaneously read by two of the DATA READING circuits. This symbol may be used to separate different transactions which are recorded on the tape. When the signal for the end-of-frame symbol is applied to the UTILIZING DEVICE 213, the BRAKE OPERATING CIRCUIT 216 may be operated directly to apply the brake 105 (FIG. 1) to arrest the record tape and thus interrupt the further reading of the tape by the photocells 201, 208 to 212 inclusive, and 215. However, the BRAKE OPERATING CIRCUIT 216 may be under the control of the UTILIZING DEVICE 213, so that one or more end-of-frame signals may be ignored, depending upon the amount of information which the UTILIZING DEVICE 213 can process at the particular time. The BRAKE OPERATING CIRCUIT 216 is shown in detail in FIG. 12.

Figure 11:
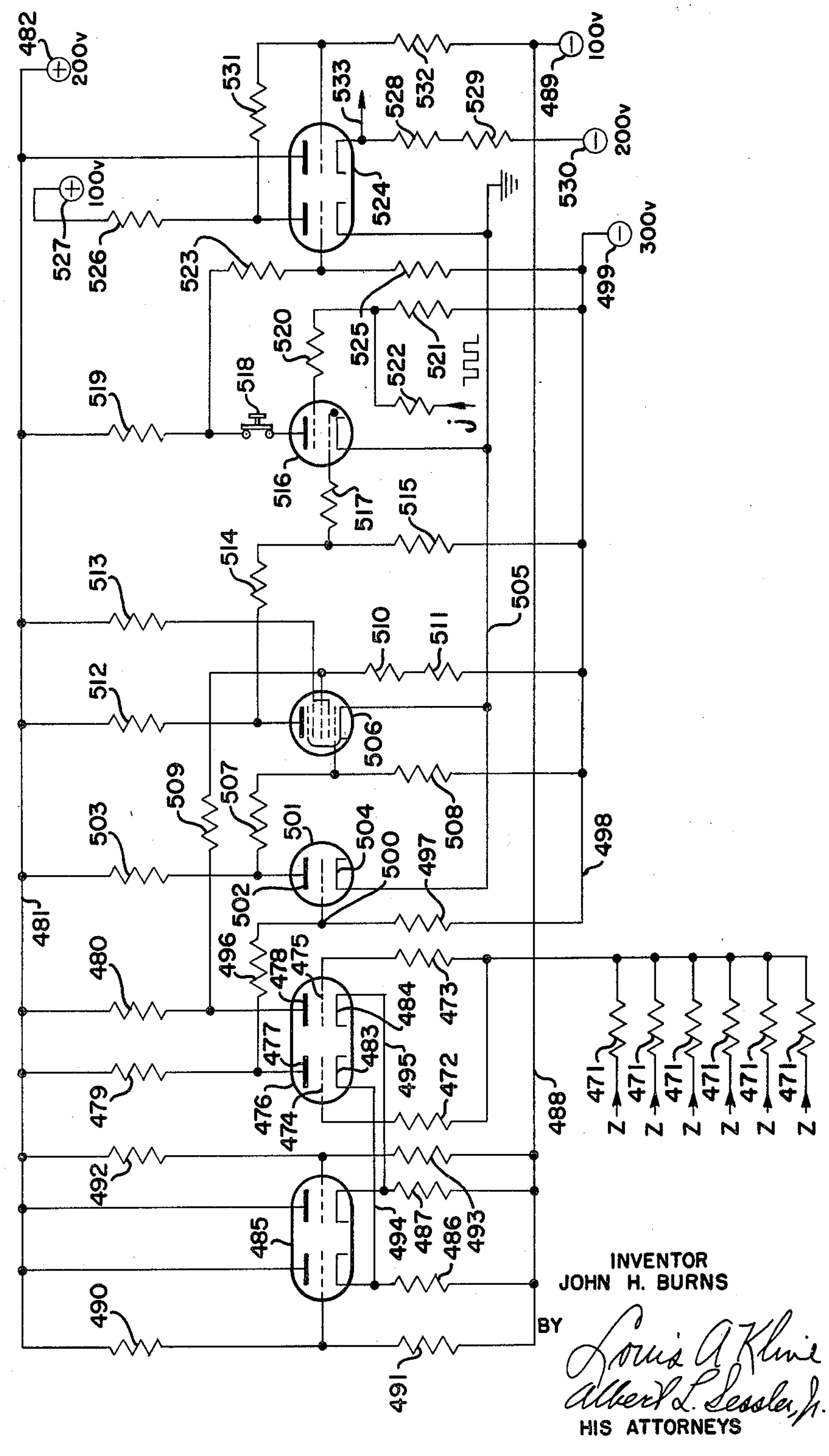
FIG. 11 shows a language checking circuit for determining the correctness of the data signals read at any character position of the tape.

Outputs from each of the DATA READING circuits 202–207 inclusive and the CLOCK circuit 214 are also applied over paths 296 and 294, respectively, to a language CHECKING CIRCUIT 217. This circuit checks for a coincidence of two data bit signals through the medium of voltage amplitude or level selection. If a voltage level corresponding to less than or more than two simultaneous data bit signals is present, an error signal, denoted by the word ERROR on the drawing, is applied over path 297 to the UTILIZING DEVICE 213. As desired, the information in error may be so marked and further processed through the UTILIZING DEVICE 213, or the BRAKE OPERATING CIRCUIT 216 may be actuated over a path 298 to arrest the tape movement until a manual inspection is had. A suitable circuit for the CHECKING CIRCUIT block 217 is shown in FIG. 11.

The modified block diagram of FIG. 7A offers a fixed program reading control. For example, it may be frame-by-frame reading with predetermined stop intervals between reading intervals. Such an arrangement permits a utilizing device to "digest" individual blocks of information in given time periods.

This type of control is attained through the use of a BRAKE CONTROL CIRCUIT 230, which receives the END-OF-FRAME signals from channels 5 and 6; i.e., DATA READING circuits 206 and 207, over paths 298, the data signals having been retimed by data sync clock signals applied to the data reading blocks over paths 291*a* and 292*a*. Immediately, the BRAKE OPERATING CIRCUIT 216 is energized to apply the brake 105 (FIG. 1), thereby stopping the tape to prevent the reading of further data therefrom. Each of the DATA READING circuits 202 to 207 inclusive and the CLOCK circuit 214 has an OUTPUT for application over paths 295*a* and 293*a*, respectively, to a utilizing device (not shown). Each of the above circuits also has an output connection over paths 296*a* and 294*a* to the CHECKING CIRCUIT 217. An ERROR signal, which may be electrical, visual, or both, is produced by the CHECKING CIRCUIT 217 on a path 297*a* whenever there is a lack of coincidence of two bit outputs.

Figure 13:
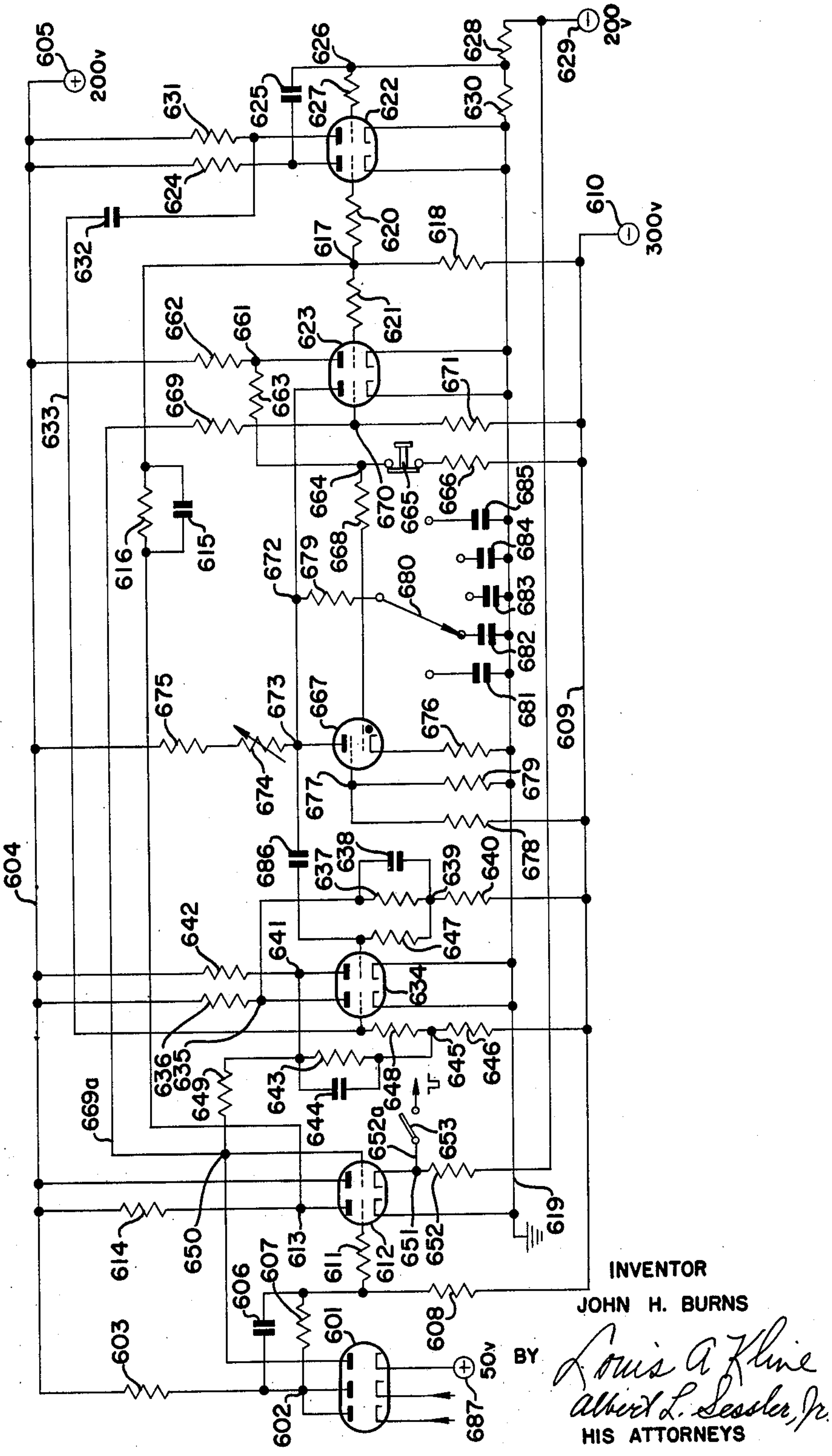
FIG. 13 shows a brake control circuit for controlling the brake-operating circuit of FIG. 12, and for causing predetermined time delays between reading intervals.

The BRAKE CONTROL CIRCUIT 230 is shown in FIG. 13, and it will later be described in detail. However, for the moment, it is sufficient to know that any desired time delay between reading intervals can be preset into this circuit. Then, after the delay, the BRAKE CONTROL CIRCUIT 230 influences the BRAKE OPERATING CIRCUIT 216 over a path 299 to relieve the brake 105 and start the next reading interval.

DETAILED DESCRIPTION

*Tape Handling and Reading Section*

The purpose of the tape handling and reading section of the novel reading apparatus is to provide means for optically detecting perforations in the tape being read, and also to control the high-speed intermittent motion characteristic of this apparatus.

As shown in FIGS. 1 to 5 inclusive, the tape handling and the reading section is mounted on frame members 121 and 122, and may be considered to be divided generally into upper and lower elements. The upper element comprises a plurality of components which are movable as a unit, to permit insertion and removal of the record tape, and said upper element is pivotally secured to four brackets 123, fixed to the frame member 122. Four members 124 are pivotally connected to the brackets 123 and are fixed together for unitary movement by a bar 125, which extends the entire length of the upper element of the reading section. Two plates 126 and 127 are secured on top of the members 124 and serve as mounting means for certain of the parts of the upper element of the reading section. Also mounted on the plates 126 and 127 are two latches 128 and 129, which cooperate with blocks 130 and 131 fixed to the frame member 121, to retain the upper element of the reading section in operative position. Each of the latches 128 and 129 comprises a knob 132, mounted on a threaded shaft 133, which has at its other end a truncated latch cone 134, arranged to coact with the blocks 130 and 131. The shafts 133 of the latches 128 and 129 pass through oval openings in the plates 126 and 127, to permit rocking back and forth of the latches 128 and 129. A spring 135 on the shaft of each of the latches 128 and 129 acts to urge the latch downward and to a vertical position. The spring 135 is compressed between a plurality of lock nuts 136 on the shaft 133 and a washer 137 secured to the under side of each of the plates 126 and 127.

Figures 1, 2, 3:
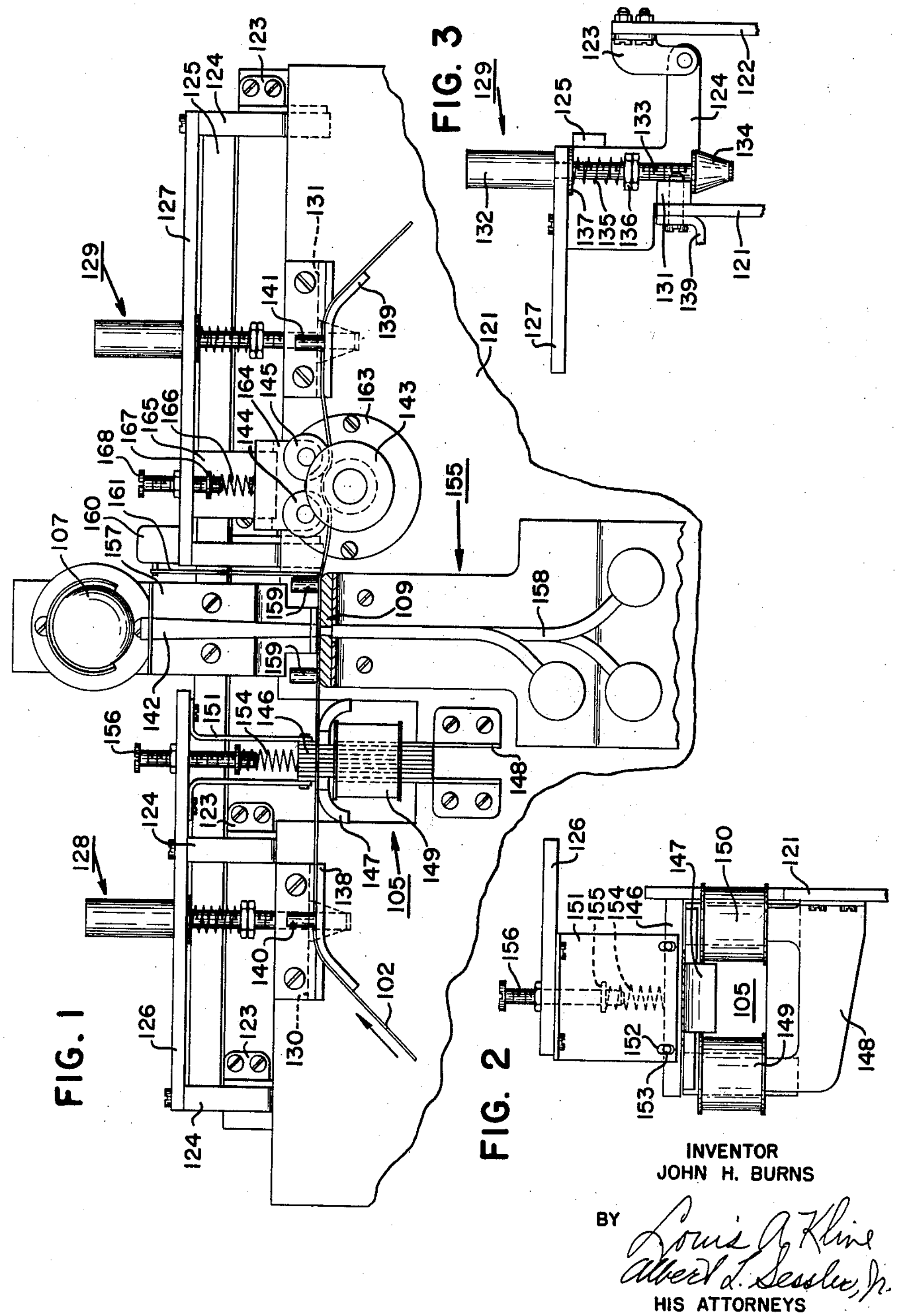
FIG. 1 is a partial side elevation of the novel tape-handling apparatus, showing particularly the tape-guiding means, the high-speed brake, the reading head, and the driving capstan.
FIG. 2 is a detail view of the high-speed brake.
FIG. 3 is a detail view of the cover latch means.
Figure 4:
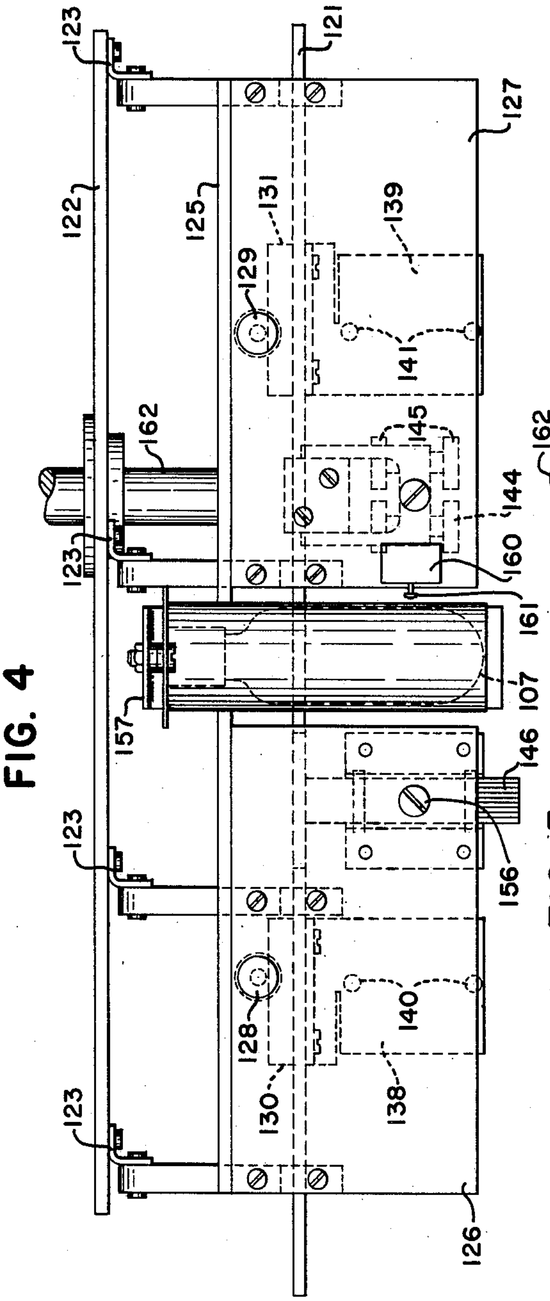
FIG. 4 is a plan view of the reading station.

It will be seen that, when it is desired to unlatch the upper element of the reading section to move it to a position in which the tape may be inserted or removed, the knobs 132 of the latches 128 and 129 may be grasped and moved in a direction toward the front of the reader, as shown in FIG. 1, or to the left, as shown in FIG. 3. This will rock the cones 134 out of engagement with the blocks 130 and 131, and will permit the upper element of the reading section to be rotated about the pivotal connections of the members 124 on the brackets 123, to an inoperative position. Similarly, when it is desired to close the upper element of the reading section, the knobs 132 of the latches 128 and 129 should be gently pulled toward the front of the machine. When the upper element of the reading section is nearly in place, these knobs are released, and the upper element is pressed down into operative position. When said element is completely closed, the latch cones 134 on the ends of the shafts 133 will snap forward under the blocks 131 on the back of the plate 121 and thus hold the upper element of the reading section in closed, operative position.

The record tape to be read will normally be supplied from a tape supply reel and will normally be recaptured by a take-up reel after it has been read. The tape handling means, generally, including the supply and take-up reels, and also including photoelectrically-controlled tape loop-forming controls for isolating the tape at the reading station from the inertia effects of the supply and take-up reels, may, if desired, be of the type disclosed in the previously cited United States patent application Serial No. 459,476. Of course, other suitable tape handling means may be employed, if desired, and it is not desired to limit the novel apparatus of the present invention to any one type of tape handling means.

The record tape 102 is normally guided through the tape handling and reading section by means of tape guides 138 and 139 (FIG. 1), fixed to the frame member 121 by the same fastening means which are used to secure the blocks 130 and 131 to said frame member. The tape 102 normally runs between a pair of studs 140 on the guide 138 and between a pair of studs 141 on the guide 139, which prevent it from being displaced transversely. In the normal reading direction of tape travel, the tape 102 passes from the supply means over the guide 138, and then between the elements of a brake 105. The brake 105 is electrically controlled by a brake-operating circuit, which will be subsequently described. After passing between the elements of the brake 105, the tape passes over a mask 109 of the reading station 106, where the perforations in the tape are sensed by means of light-sensitive elements, in a manner which will subsequently be described. The tape then passes between a continuously rotating capstan 143, located to the right of the mask 109, as viewed in FIG. 1, and cooperating idler rolls 144 and 145, which urge the tape 112 into engagement with the capstan 143 to cause said tape to be driven through the reading section, over the right-hand guide member 139, and thence to the take-up reel (not shown).

The brake 105 utilizes the mechanical force produced by a magnetic field at an air gap in an iron path to produce the braking force on the tape 102. Friction of the tape on the brake surfaces then stops the tape motion by overriding the pulling forces of the capstan 143. The surfaces of the brake 105, which act upon the tape 102 to stop the motion of said tape, include an armature 146 and a supporting plate 147, positioned, respectively, above and below the tape 102.

The armature 146 is mounted on the plate 126 by means of a supporting bracket 151, and normally rests on the tape. Slots 152 in the bracket 151 cooperate with pins 153 projecting from the armature, to guide the armature in movement relative to the supporting plate 147. The weight of the armature 146 applies a slight pressure to the tape at all times, resulting in a slight drag, which is overcome by the driving capstan 143 in cooperation with the idler rolls 144 and 145. This insures that the tape will be taut as it passes the reading station 106. A spring 154 is provided to prevent bounce of the armature 146 and to control the pressure of the armature on the tape, and is compressed between the armature and a collar 155 mounted on a bolt 156, which in turn is mounted in the plate 126. If desired, the armature may be ground out about 0.002 inch in the center where the tape passes under it in order to reduce the total air gap in the magnetic path of the brake, and thereby allow faster force build-up because of the reduced reluctance of the path.

Immediately to the right of the brake 105 is positioned the reading station, generally designated as 106. As has been stated, the tape 102 is read optically. A light source or bulb 107 illuminates the tape 102 at the reading point through a wedge 142 of a light-conducting material, such as a methyl methacrylate resin, of the type manufactured under the trade name of Lucite, which has been polished to provide optical surfaces which enhance internal reflection of the light entering the end of the wedge nearest the bulb 107. The wedge 142 serves three purposes. First, it makes it possible to mount the light source or bulb 107 farther from the tape 102, and thereby makes it easier to ventilate the bulb area for removal of heat. Secondly, the reflections within the wedge 142 tend to produce a more uniform lighting at the tape than the light source or bulb 107 would produce if it were placed nearer to the tape without the wedge 142. Thirdly, because the wedge 142 is wider at the top, near the light source, than at the bottom, near the tape, and because theoretically, 90% of the light entering the end of the wedge 142 will be transmitted out the other end, the light intensity at the tape is theoretically equivalent to the light intensity somewhere inside the bulb itself, even though the bulb is positioned several inches from the tape. The wedge is held at its top and bottom by a bracket 157, which in turn is secured to the bar 125. The light source 107 is also supported on this same bracket 157.

Figure 5:
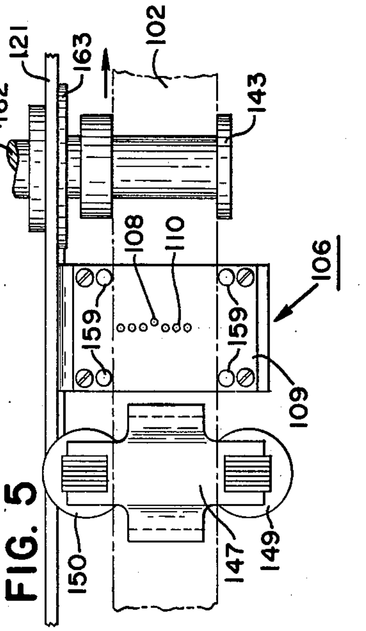
FIG. 5 is a plan view of the sensing mask of the reading station, and also shows the high-speed brake and the driving capstan.

In the closed position of the upper element of the reading section, the lower end of the wedge 142 is lined up with a row of apertures in the mask 109. These apertures include a clock reading aperture 108 and six data reading apertures 110. These apertures 108 and 110 are spaced on centers corresponding to the lateral spacing of the rows of holes in the tape 102. Inserted into these apertures are the tips of seven rods 158 of Lucite or some other light-transmitting material, each of which is optically polished and then masked to keep out the extraneous light. Each of these rods 158 conducts light, which passes through the holes in the tape 102 as they pass the end of the rod, downward to one of the seven photo-tubes 201, 208 to 212 inclusive, and 215, which are mounted in two vertical rows below the mask. These tubes are also masked to exclude room light. It will be noted that the aperture 108 in the mask 109, which corresponds to the sprocket hole 103 on the tape 102, is slightly displaced to the right, as shown in FIG. 5, of all of the other apertures in the mask 109. The purpose of this displacement is to provide a one-half-bit time delay in reading the sprocket hole on the tape, thereby making it possible to use this sprocket hole signal for retiming all of the bit signals from the other channels. The actual electronic retiming of the bit outputs will be described in detail in a subsequent section entitled "The Clock Circuit."

The tape 102 is guided by four studs 159, as it passes over the mask 109. The two rear studs 159 are so located that by placing the tape 102 on the mask 109, in its proper orientation, and pressing the edge of the tape against the studs, the holes in the tape will be in proper register with the apertures in the mask. The two front studs 159 are provided to keep the tape in this position. A plurality of different locations may be provided for the front studs 159, as well as for the front studs 140 and 141 on the guide members 138 and 139, in order to make it possible to read different widths of tape with this mechanism.

To the right of the light source 107 on the upper element of the reading section is mounted a snap-action switch 160, to the actuator of which is attached a wire feeler 161, bent approximately in the shape of a J. The arrangement of this feeler is such that the curved lower portion of the wire will rest upon the tape 102 when the upper element of the reading section is in operative position. While this end of the feeler 161 rests upon the tape 102, the switch 160 is in an actuated condition. When the end of the tape passes under the feeler 161, said feeler is free to rotate the actuator of the switch 160 into the non-actuated or normal position of said switch. In this way, the switch 160 performs two functions for the electrical circuit control. First, it indicates that there is tape in the machine to be read; and second, it indicates that the upper element of the reading section has been closed and that all pressure rolls, brake armature, etc., are in place for proper reading of the tape 102.

The continuously rotating capstan 143 to the right of the reading station 155 is driven by a shaft 162, which in turn is powered by a motor (not shown) of the tape handling and reading apparatus, and which extends through the frame members 121 and 122, and is journaled in the member 121 by means of a bearing 163. The idler rolls 144 and 145, which urge the tape 102 into frictional engagement with the capstan 143 for the driving of said tape by the capstan, are mounted in a block 164 suspended from the plate 127 by a bracket 165. A spring 166, extending between the block 164 and a collar 167 on a bolt 168, threaded into the plate 127, resiliently urges the idler rolls 144 and 145 into engagement with the tape 102 to frictionally engage said tape with the capstan 143 for the driving of said tape by said capstan. The bolt 168 may be threaded in or out of the plate 127 to adjust the degree of compression in the spring 166 and thereby control the force with which the block 164 and the idler rolls 144 and 145 are urged downwardly.

To the right of the capstan 143, as shown in FIG. 1, is the guide member 139, over which the tape 102 passes after having been driven past the capstan 143. As has been previously stated, the tape 102, after passing over the guide 139, may be collected by a take-up reel or other storage means. Of course, if it is not desired to keep the tape after it has been read, the tape 102, after passing over the guide 139, may be dropped into a bin or other receptacle, after which it may be destroyed.

*The Clock Circuit*

Figure 9:
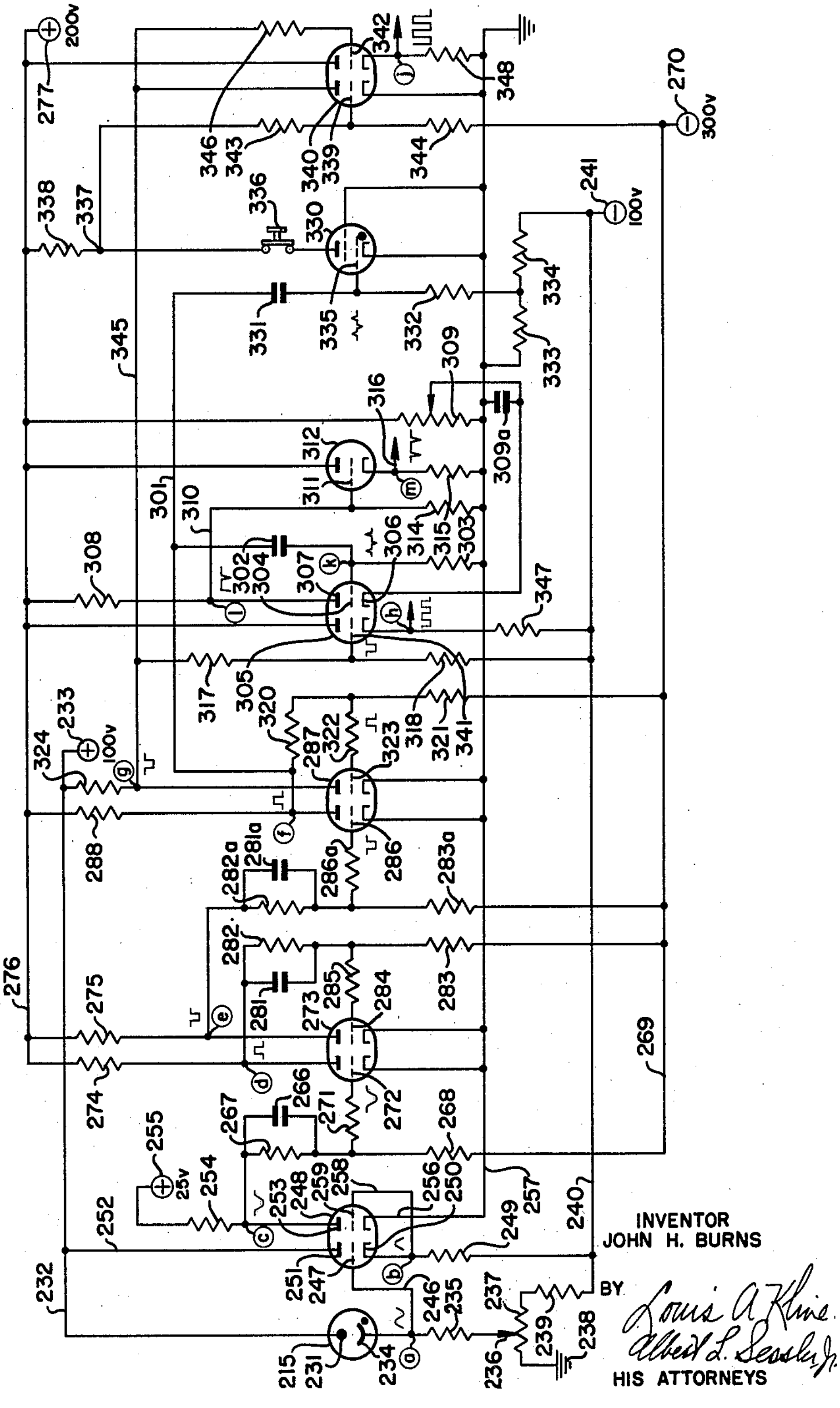
FIG. 9 shows a clock circuit employed in the present invention.

Electrical retiming of the bit signals based on the mechanical displacement at the reading station 106 (FIG. 5) is derived from the circuit of FIG. 9, where the sprocket holes 103 (FIG. 6) of the clock channel 214 are "read." In FIG. 9, an input photocell 215, of, for example, the gaseous type 5583, receives light from the bulb 107 (FIG. 1) through the sprocket holes 103 (FIG. 6) of the record tape 102. The anode 231 of the photocell 215 is connected over a lead 232 to a +100-volt D.C. terminal 233, and the cathode 234 is connected over a 10-megohm load resistor 235 to a slidable tap 236 of a 10,000-ohm potentiometer 237, grounded at 238, and connected over a 22,000-ohm fixed resistor 239 and lead 240 to a −100-volt D.C. terminal 241.

Figure 8A:
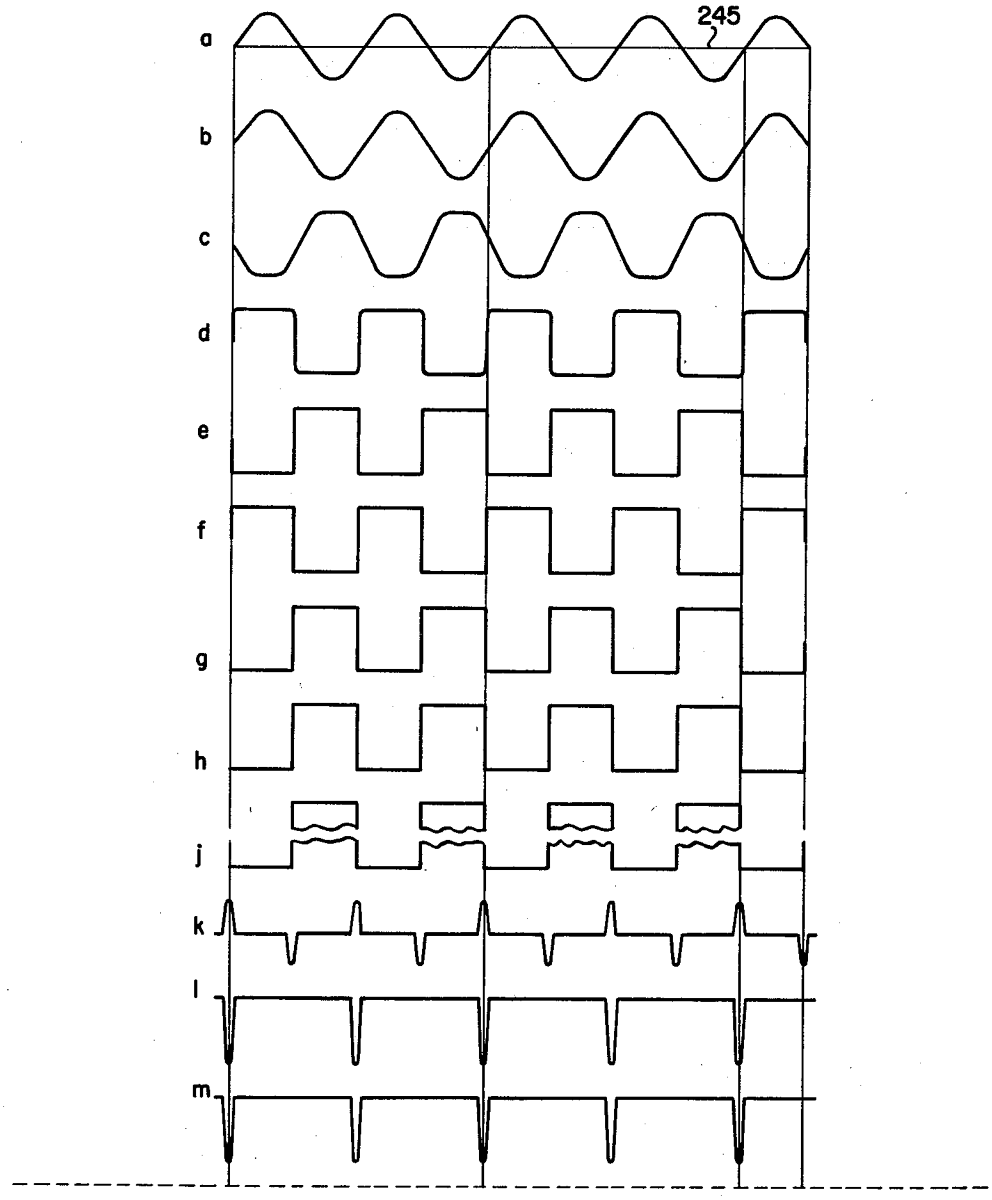
FIG. 8A shows a plurality of wave forms developed at selected points in the clock circuit of FIG. 9.

The tape clock signal shown at *a* in FIG. 8A is generated at point *a* in the circuit of FIG. 9, being developed mainly across the large cathode-connected load resistor 235. The uniformity of spacing of the feed or sprocket holes 103 (FIG. 6) generally accounts for the uniform clock signal *a*. However, the record tape 102 is somewhat translucent, so that an underlying static light intensity is present at all times at the cathode 234 of the clock pickup photocell 215 (FIG. 9). The potentiometer tap 236 provides a threshold adjustment for current through the photocell 215 such that the modulation appearing as the clock signal *a* is approximately symmetrical with respect to its horizontal axis 245 (FIG. 8A), the nearly sinusoidal appearance resulting from the round sprocket holes 103 of the tape 102 crossing the round clock reading aperture 108 of the mask 109 (FIG. 5).

From point *a* of FIG. 9, the clock signal *a* (FIG. 8A) is applied over lead 246 to the control electrode 247 of the left-hand section of a type 5965 duo-triode tube 248. The left-hand triode section of tube 248 is connected as a cathode-follower, having a cathode load resistor 249, of 100,000 ohms, between its cathode 250 and the common lead 240, which extends to the −100-volt D.C. terminal 241. The anode 251 of the left-hand triode section of tube 248 is connected over leads 252 and 232 to the +100-volt D.C. terminal 233. The left-hand triode section of tube 248, being a cathode-follower, is used only as a signal impedance level reducer. Therefore, the clock signal *b* (FIG. 8A) appearing across the load resistor 249 at point *b* is identical to the clock signal *a* (FIG. 8A). At point *b*, the clock signals measure about 4 volts in amplitude.

Next, the clock signal is somewhat squared. This is accomplished in the right-hand triode section of tube 248, which triode section is connected to operate as a Class C amplifier with low anode potential. The anode 253 is connected through a 33,000-ohm load resistor 254 to a +25-volt D.C. terminal 255, and is also connected at point *c* over a parallel combination of a 0.001-microfarad capacitor 266 and a 180,000-ohm resistor 267, a series-connected 3-megohm resistor 268, and a lead 269 to a −300-volt D.C. terminal 270. The cathode 256 extends to a common ground lead 257.

The clock signal from point *b* is applied over lead 258 to the control electrode 259 of the right-hand triode section of the tube 248. The clock signal output from this triode section, as observed at point *c* across load resistor 254, is shown in FIG. 8A as the somewhat squared signal *c*. The signal *c* is, of course, inverted with respect to the signal *b* due to the amplifier action of the right-hand triode section of tube 248.

A grid current loading resistor 271 of 470,000 ohms extends the signal path from the circuit of the anode 253 to the control electrode 272 of the left-hand triode section of a type 5965 duo-triode tube 273. The anode of this section is connected over a 100,000-ohm resistor 274 to the lead 276, which extends to the +200-volt D.C. terminal 277, and is also connected at point *d* over the parallel combination of a 0.001-microfarad capacitor 281 and a 270,000-ohm resistor 282, an 820,000-ohm resistor 283, and the lead 269 to the −300-volt D.C. terminal 270. The cathode of the left-hand section of the tube 273 is connected to the common ground lead 257. In a similar manner, the anode of the right-hand section of the tube 273 is connected over a 100,000-ohm resistor 275 and the common lead 276 to the +200-volt D.C. terminal 277 and is also connected over the parallel combination of a 0.001-microfarad capacitor 281*a* and an 820,000-ohm resistor 282*a*, an 820,000-ohm resistor 283*a*, and the common lead 269 to the −300-volt D.C. terminal 270. The cathode of the right-hand triode section of the tube 273 is connected to the common ground lead 257.

The signal applied to the input triode shown at the left-hand side of tube 273 has an amplitude of approximately 15 volts at the control electrode 272. This amplitude is sufficient to swing the triode section fully through its operating characteristic to provide for the squaring, as is evidenced at the anode junction point *d* by the wave *d* of FIG. 8A. The control electrode 284 for the right-hand triode section of the tube 273 receives the signal input from the anode circuit of the left-hand section of said tube over a 470,000-ohm electrode current limiting resistor 285. This triode also affords some squaring action, so that the wave form appearing at point *e* is as shown at *e* in FIG. 8A.

The signal wave form *e* is applied through a D.C. coupling arrangement identical to that just described in connection with the coupling between the triode sections of tube 273, over a 470,000-ohm resistor 286*a* to the input control electrode 286 of the left-hand triode section of a type 5965 duo-triode tube 287. The anode of this section is connected over a 100,000-ohm resistor 288 and the common lead 276 to the +200-volt D.C. terminal 277, and is also connected over a 270,000-ohm resistor 320 and an 820,000-ohm resistor 321 to the −300-volt lead 269. The cathode of said section is connected to the ground lead 257. The wave form appearing at point *f* in the anode circuit of this triode section is shown at *f* in FIG. 8A. This wave form is, of course, inverted from that shown at *e*.

The clock circuit of FIG. 9 has been designed to develop, from the wave form *f*, three different clock output signals, comprising a data sync signal, an output or tape clock signal, and a language checking signal. The uses for these signals have been explained in connection with the block diagrams of FIGS. 7 and 7A. In FIG. 7, it will be recalled, the two paths 291 and 292 are provided to apply the data sync signal to the data reading circuits for retiming of the data signals developed from the data channels on the tape. The clock signal block 214 also provides the output path 293 for transmission of an output or tape clock signal to the utilizing device 213, while the path 294 is provided for application of a language checking clock signal to the checking circuit 217. The paths 291*a*, 292*a*, 293*a*, and 294*a* serve similar functions in the system of FIG. 7A.

At any time that the machine is initially set into operation, there may exist a condition in the data reading circuits corresponding to the various data channels, indicating false information. Such a condition may result from the random states assumed by flip-flops, trigger pairs, or the like as the power is applied. For the foregoing reason, it is necessary to apply a data sync pulse to each of the data reading channels in order to set the flip-flops to the condition indicated by the presence or absence of a signal at their corresponding photocells. In the illustrated embodiment, information in the form of holes in the tape will cause data signals to be developed in two of the data reading circuits when a data sync pulse is applied thereto, but the remaining circuits will have their flip-flops placed to a false condition because of the absence of holes at their corresponding photocells.

Under normal conditions of operation, the three clock signals will be developed simultaneously; i.e., the data sync signals, the language check signals, and the output or tape clock signals will be developed in the clock channel and applied to the remaining circuitry. However, for purposes of setting up the circuit for the initial character read, it has been pointed out that the single data sync pulse was required to properly set the data reading channels. Otherwise, what might be erroneous data in the data reading channels would be "read into" the utilizing device if the output or tape clock signal were present, and would also be applied to the checking circuit if the language checking clock signal were present, both of these operations requiring a coincidence of a clock and a character signal, the latter being made up of one or more data signals (two, in the illustrated embodiment) from the various data channels. The application of the data sync pulse to the data reading channels in the absence of the other two clock signals is therefore required, and is made through the expedient of inhibiting the other two clock signals at the time of reading the initial character. After the first character has been sensed, the remaining clock signals are restored to their normal position. Furthermore, there will be no data lost by inhibition of the first data output and language checking clock signals, because the output clock signal applied to the utilizing device, which corresponds to the data signals for the first character position read from the tape, is generated from the clock perforation corresponding to the data perforations for the next character on the tape.

Returning to the detailed circuit of FIG. 9, the development of the data sync pulses will first be followed. The clock signal as represented at *f* in FIG. 8A is utilized to develop the data sync pulses. Hence, from point *f* in the anode circuit of the left-hand triode section of tube 287, a path is provided over lead 301 to a differentiating network which includes a 100-micro-micro-farad capacitor 302 and a 1-megohm resistor 303 connected in series between the common ground lead 257 and the lead 301. The control electrode 304 for the right-hand triode section of a type 5965 duo-triode tube 305 is connected to the junction point between the capacitor 302 and the resistor 303. Hence, the control electrode reecives a positive spike or pulse at the time of the clock wave rise and a negative-going pulse at the time of the clock wave fall (FIG. 8A), as shown in a comparison of the waves *f* and *k*.

The cathode 306 of the right-hand triode section of the tube 305 is connected into a 100,000-ohm potentiometer 309, in turn connected between ground and the +200-volt lead 276 to serve as an amplification control for the right-hand triode section of tube 305. A by-pass capacitor 309*a* of 0.01 microfarad, is connected across that portion of the potentiometer which is tapped off as the cathode potential above ground.

The anode 307 of the right-hand triode section of the tube 305 is connected over a 100,000-ohm resistor 308 to the +200-volt lead 276 and is also connected at point *l* to the ground lead 257 over a 270,000-ohm resistor 314. With the cathode positively biased, only the positive-going spikes produced from the differentiation of the squaring clock wave will be effective to produce negative-going clock spikes on the anode lead as shown at point *l* and indicated by the negative-going clock spikes in the wave *l* of FIG. 8A. While these applied clock spikes were of the positive variety, they now appear in the negative sense at point *l* due to the amplifier action of the right-hand triode section of tube 305.

These negative-going spikes are fed directly over lead 310 to the control electrode 311 of a cathode-follower-connected triode tube 312. The anode of this tube is connected over the lead 276 to the +200-volt D.C. terminal 277, and the cathode of the tube 312 is connected over a load resistor 315, of 100,000 ohms, to the ground lead 257. The negative-going pulses then become available at the output lead 316, which is connected to the cathode circuit of the tube 312, for use as data sync pulses throughout the remaining circuitry. The wave form for the data sync pulses is shown at *m* in FIG. 8A, the point *m* being indicated at the output lead 316. As will become apparent hereinafter, the data sync pulses are applied as the clock input to each of the data reading circuits, as, for example, over paths 291 and 292 of FIG. 7, or over paths 291*a* and 292*a* of FIG. 7A.

The manner in which the remaining two clock output signals were inhibited and only released after the appearance of the first data sync pulse will now be described. Returning to the duo-triode tube 287, it will be recalled that the clock wave *f* (FIG. 8A) appeared at point *f* in the anode circuit of the left-hand triode section thereof. This was the wave which was used to develop the data sync wave *m*. There is also a path from point *f* over a 270,000-ohm resistor 320 in series with an 820,000-ohm resistor 321 to the −300-volt lead 269. The clock wave is applied over a 1-megohm electrode protecting resistor 322, which is coupled to the anode circuit of the left-hand section of the tube 287 between the resistor 302 and 321, to the control electrode 323 of the right-hand triode section of tube 287. The anode circuit for this triode section includes a 100,000-ohm load resistor 324, which extends to the +100-volt terminal 233, and also includes series-connected resistors 317 and 318, of 270,000 ohms and 2.2 megohms, respectively, which extend to the −100-volt lead 240. The potential of the lower end of the load resistor 324, identified at point *g* and the anode of the right-hand section of the tube 287, is initially clamped at nearly ground potential by a circuit to be described subsequently, and is released by the first data sync pulse. Therefore, even though the clock signal from point *f* is available at the control electrode 323 of the right-hand section of tube 287, this signal is not effective to produce changes in potential in the anode circuit because of the clamping action.

In the clamping circuit, there is included a memory device in the form of a gas tube 330 of the 5663 variety, the tube being in its "off" condition or non-conducting condition when the the apparatus is initially put into operation, and remaining so until the first data sync pulse appears. The anode of this tube is connected over a reset switch 336, a point 337, and a 47,000-ohm resistor 338 to the +200-volt lead 276, and is also connected over the point 337, a 270,000-ohm resistor 343, and an 820,000-ohm resistor 344 to the −300-volt D.C. terminal 270. The cathode and the #2 electrode are connected to the ground lead 257. The firing path for this tube is over the lead 301, which extends from point $f$ in the anode circuit of the left-hand triode section of tube 287. In lead 301 there is also connected a differentiating circuit including a 120-micro-microfarad capacitor 331 and a 1-megohm resistor 332. The 1-megohm resistor 332 is connected between a 10,000-ohm resistor 333 and a 100,000-ohm resistor 334, which establishes approximately a −9-volt potential level at the lower end of the resistor 332. The #1 control electrode 335 of the gas tube 330 is connected into the differentiating circuit between the capacitor 331 and the resistor 332 to receive a firing pulse. Since the clock wave applied to the differentiating circuit connected to the #1 control electrode 335 is that shown at $f$ in FIG. 8A, the control electrode 335 will receive a differentiating wave similar in form to that shown at $k$ in FIG. 8A. It is the first positive spike of this type of wave which fires the gas tube 330, it being noted that the anode switch 336 is normally in its closed position and is provided only for resetting purposes at the completion of reading of a reel of tape, so that the tube 330 will be in "off" condition at the beginning of the next tape-reading operation. The switch 336 either may be actuated by the machine operator, as by a push button, or may be arranged to be opened automatically whenever the upper portion of the tape handling and reading section is raised for insertion or removal of tape.

Until the gas tube 330 is fired, its anode is at almost +200 volts, and this causes the left-hand section of the tube 340 to conduct and reduce the potential of its anode and point $g$ to nearly ground potential. When the gas tube 330 is fired, its anode potential at point 337, the lower end of its 47,000-ohm anode resistor 338, is suddenly depressed, so that the control electrode 339, which is coupled between the resistors 343 and 344, of the left-hand triode section of a duo-triode tube 340, which may be of type 5965, is also depressed. The anode of this section of the tube 340, which is connected over a lead 345 to point $g$ on the anode circuit of the right-hand section of the tube 287, is also connected over a 1-megohm resistor 346 to the right-hand section of the tube 340. The cathode of the left-hand triode section of the tube 340 is connected to the ground lead 257. Depression of the potential on the control electrode 339 stops the conduction in the left-hand triode section of the tube 340, which operation in turn causes a rise in the anode potential of this section and thus releases, over lead 345, the clamp from point $g$ in the anode circuit of the right-hand triode section of tube 287. When this clamping action is removed, the other two clock outputs become available. The wave $f$ from point $f$ in the left-hand triode section of tube 287 is now permitted to influence the right-hand triode section of this tube, so that the inverted clock wave form $g$ now appears at point $g$. This clock wave is applied to the control electrode 341 of a cathode follower tube section comprising the left-hand triode section of tube 305. The anode of this section of the tube 305 is connected to the +200-volt lead 276, while the cathode is connected over a 47,000-ohm resistor 347 to the −100-volt lead 240. Accordingly, the wave $h$ is developed at point $h$ in the cathode circuit of this section for use as the output or tape clock signal throughout the remaining circuitry. The output or tape clock signal is applied to the utilizing device as, for example, over the path 293 in FIG. 7, or over the path 293$a$ in FIG. 7A.

With the clamping removed from point $g$, the same clock signal is also available at the control electrode 342 of the right-hand triode section of tube 340. The anode of this section of the tube 340 is connected to the +200-volt D.C. terminal 277, while the cathode is connected over a 100,000-ohm resistor 348 to the ground lead 257. Application of the signal from point $g$ to the control electrode 342 produces the output wave $j$ (FIG. 8A) at the point $j$ in the cathode circuit of the right-hand section of the tube 340, which wave provides the language checking clock signal. The language checking clock signal is applied to the language checking circuit 217, as, for example, over the path 294 in FIG. 7, or over the path 294$a$ in FIG. 7A.

Although the waves $h$ and $j$ appear to be duplicates, it will be pointed out that the amplitude of the latter or language checking clock signal is much greater than the amplitude of the output or tape clock signal. The tape clock signal actually provides the logical levels of operation for the circuitry of the present invention, these levels being illustratively 0 and +50 volts.

*The Data Reading Circuit*

The means for translating the data bit holes on the tape to electrical signals for input to the utilizing device will now be described. The circuit (FIG. 10) for only one data channel will be described, since identical circuits are employed for the remaining channels.

Figure 10:
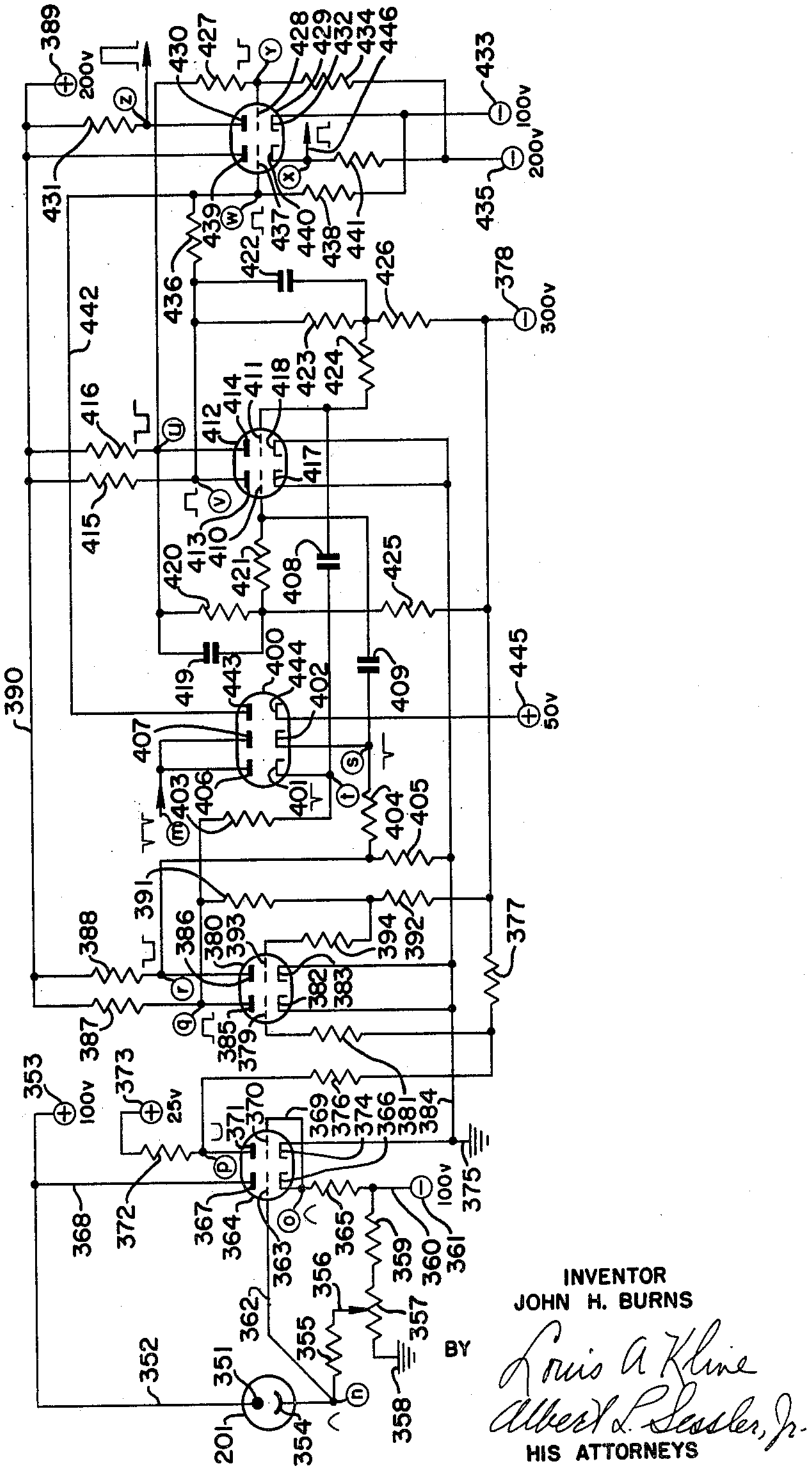
FIG. 10 shows a typical reading circuit for use in reading a single tape channel.

The light signals from the data bits on the tape are carried from the mask 109 (FIG. 1) through the light transmitting rods 158 to the photocells 201 and 208 to 212 inclusive, one for each data channel on the tape. In FIG. 10, an input photocell 201 of, for example, type 934, receives light from the bulb 107 (FIG. 1) through data channel holes 104 (FIG. 6) of one of the data channels of the record tape 102. The anode 351 of the photocell 201 is connected over a lead 352 to a +100-volt terminal 353, and the cathode 354 is connected over a 10-megohm load resistor 355 to a slidable tap 356 of a 10,000-ohm potentiometer 357, which potentiometer is grounded at 358, and is connected over an 18,000-ohm fixed resistor 359 and lead 360 to a −100-volt terminal 361.

Figure 8B:
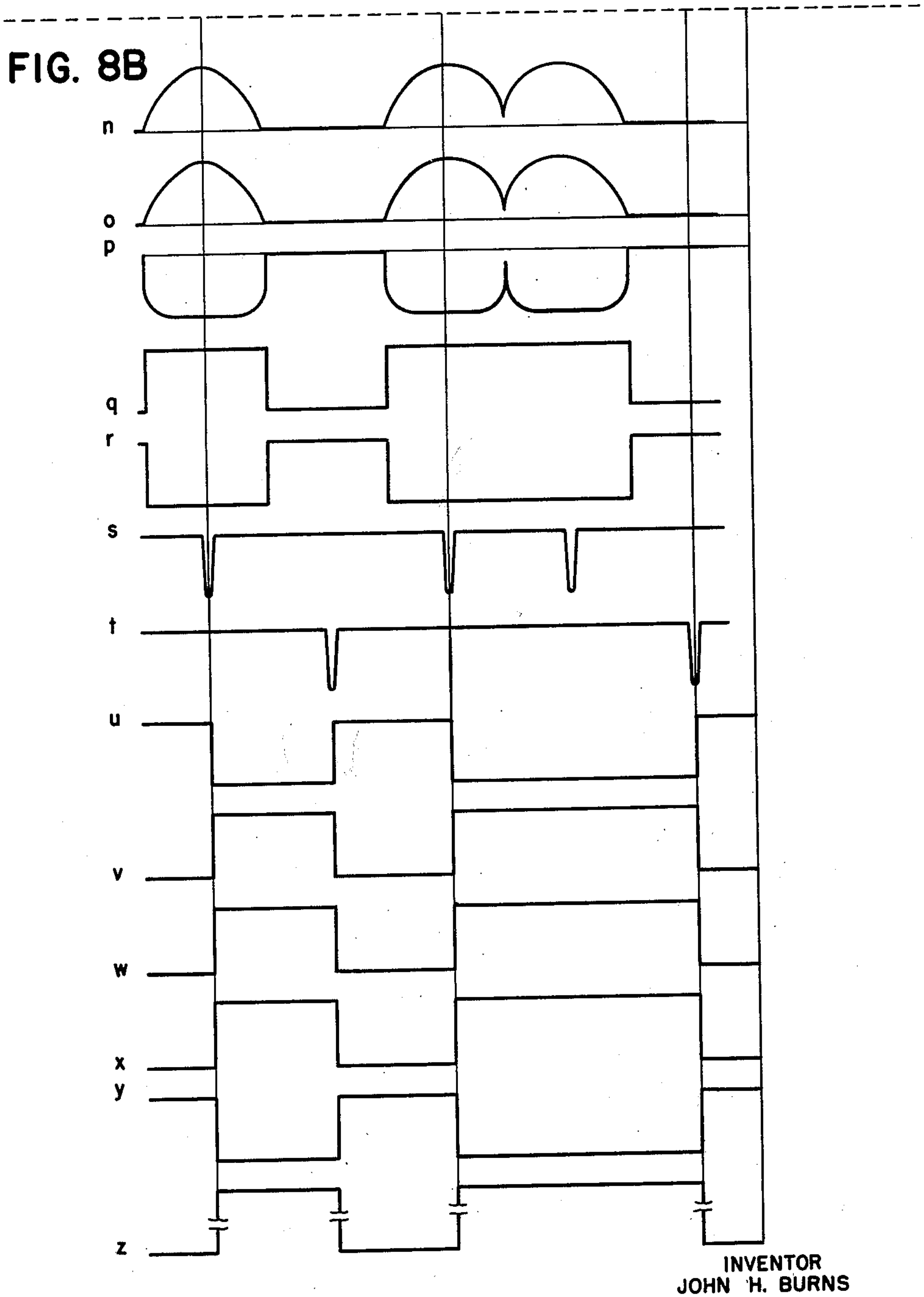
FIG. 8B shows a plurality of wave forms developed at selected points in the data-reading circuit of FIG. 10.

The data bit signal shown at $n$ in FIG. 8B is generated at point $n$ in the circuit of FIG. 10, being developed mainly across the large cathode-connected load resistor 355. Due to the fact that the record tape 102 is somewhat translucent, an underlying static light intensity is present at all times at the cathode 354 of the data bit photocell 201 (FIG. 10). The potentiometer tap 356 provides a threshold adjustment for current through the photocell 201 such that the modulation appearing as the data signal $n$ (FIG. 8B) may be properly adjusted.

From point $n$ of FIG. 10, the data bit signal $n$ (FIG. 8B) is applied over lead 362 to the control electrode 363 of the left-hand section of a type 5965 duo-triode tube 364. The left-hand tube section of the tube 364 is connected as a cathode follower, having a cathode load resistor 365, of 100,000 ohms, between its cathode 366 and the common lead 360, which extends to the −100-volt terminal 361. The anode 367 of the left-hand tube section of tube 364 is connected over leads 368 and 352 to the +100-volt terminal 353. The left-hand triode tube section of the tube 364, being a cathode follower, is used only as a signal impedance level reducer. Therefore the data bit signal $o$ (FIG. 8B) appearing across the load resistor 365 at point $o$ is identical to the data bit signal $n$ (FIG. 8B).

The data bit signal from point $o$ is applied over a lead 369 to the control electrode 370 of the right-hand tube section of the tube 364. The anode 371 of this section is connected through a 33,000-ohm load resistor 372 to a +25-volt terminal 373, and is also connected over a 180,000-ohm resistor 376 and a 3-megohm resistor 377 to a −300-volt terminal 378. The cathode 374 extends to a ground lead 375. This right-hand section of the tube 364 operates as a Class C amplifier and causes a signal output from this section, as observed at point $p$, to be somewhat squared in configuration and inverted with respect to the signal $o$, as shown in FIG. 8B at $p$.

The control electrode 379 of the left-hand section of a type 5965 duo-triode tube 380 is connected over a 470,000-ohm resistor 381 to the point of intersection of the resistors 376 and 377 in the circuit of the anode 371. The two cathodes 382 and 383 of the tube 380 are connected over a lead 384 and the lead 375 to ground. The anode 385 of the left section is connected over a 100,000-ohm anode resistor 387 to a +200-volt terminal 389 by a lead 390, and is also connected over a 220,000-ohm resistor 391 and an 820,000-ohm resistor 392 to the −300-volt terminal 378. The anode 386 of the right-hand triode section of the tube 380 is connected over a 100,000-ohm resistor 388 and the lead 390 to the +200-volt terminal 389, and is also connected overa 270,000-ohm resistor 405 to the ground leads 384 and 375. The control electrode 393 of the right-hand triode section of the tube 380 is connected to the point of intersection of the resistors 391 and 392 over a 470,000-ohm resistor 394.

The wave *p* (FIG. 8B) appearing at point *p* of the anode circuit of the right-hand section of a tube 364 is applied over the resistors 376 and 381 to the control electrode 379 of the left-hand triode section of the tube 380. This triode section is operated as a Class C amplifier and is considerably overdriven, which causes it to square the signal, as shown in FIG. 8B, where the signal *q* is that appearing at point *q* in the circuit of the anode 385. The signal of point *q* is fed over the resistors 391 and 394 to the control grid 393 of the right-hand triode section of tube 380, which is also operating Class C, and which inverts the signal. This signal output from the right-hand triode section of tube 380 is shown in FIG. 8B as *r*, which is taken from point *r* on the circuit of the anode 386. The signals *q* and *r* swing between +180 and +20 volts.

A triple-diode tube 400, of type 6BJ7, has its left-hand and middle cathodes 401 and 402 connected to points *q* and *r* on the anode circuits of the duo-triode 380 over 470,000-ohm resistors 403 and 404, respectively. Data sync clock pulses being generated by the clock circuit of FIG. 9 and having the wave form shown at *m* in FIG. 8A are applied to the left-hand and middle anodes 406 and 407 of the tube 400. The D.C. level from which these negative pulses originate is approximately +180 volts, so that their level is approximately equal to the upper limit of the voltage swing of the signals at points *q* and *r*.

Normally the cathode 401 is held at about +180 volts by either the clock signal *m* applied to the anode 406 or by the bit signal *q* applied over resistor 403, and the only time that the cathode 401 can fall below that voltage is when both the potential of the anode 385 of the tube 380 and the potential of the anode 406 of the tube 400 are below +180 volts. The signal appearing at point *t* on the circuit of the cathode 401 is shown at *t* in FIG. 8B.

In a manner similar to that described above, the cathode 402 is normally held at about +180 volts either by the clock signal *m* applied to the anode 407 or by the bit signal *r* applied over resistor 404, and the only time that the cathode 402 can fall below that voltage is when both the potential of anode 386 of tube 380 and the potential of the anode 407 of the tube 400 are below +180 volts. The signal appearing at point *s* on the circuit of the cathode 402 is shown at *s* in FIG. 8B.

It should be noted that the signal at point *q* is always the inverse of the signal at point *r*. Therefore, when the left-hand diode of the tube 400 is gated on by the signal at point *q*, the center diode of the tube 400 is gated off by the signal at point *r*, and vice versa. The data sync clock pulses which are being supplied to the anodes 406 and 407 of the above-mentioned diodes are in coincidence with the fall of the tape clock output. This means that the pulses *s* and *t* (FIG. 8B) which appear at the cathodes 401 and 402 of these diodes are in time with the tape clock falls, and the presence or absence of a bit hole in the tape 102 determines which diode cathode will provide the pulse at any given time. Earlier, in the discussion of the tape reading mask 109, it was pointed out that the aperture 108 (FIG. 9) for reading the smaller tape feed hole 103 is displaced slightly to the right (in the direction of tape travel) of the bit reading apertures. This causes the tape clock signal fall to occur at approximately the center of the bit signal as it is read from the tape, and eliminates the need for use of an electronic delay in the clock circuit to transpose the data sync pulses to this midpoint in the bit reading time, which would have been required if the feed hole reading aperture 108 had been placed in line with the bit reading apertures in the mask 109. Such an electronic delay would be a fixed time delay and would be constant regardless of tape speeds. A mechanical delay such as that which is provided in the reading mask by displacement of the aperture 108 with respect to the bit reading apertures is conscious of frequency and keeps timing of the data sync clock pulses, so that said pulses fall near the center of the bit signal regardless of tape speed.

The cathodes 401 and 402 are A.C.-coupled over 150-micro-microfarad capacitors 408 and 409, respectively, to the control electrodes 410 and 411 of the right and left-hand triode sections of a type 5965 duo-triode tube 412, which is connected to operate as a trigger pair. The anodes 413 and 414 of the duo-triode tube 412 are connected over 100,000-ohm anode resistors 415 and 416 and over the lead 390 to the +200-volt terminal 389, and the cathodes 417 and 418 of the tube 412 are connected over the lead 384 to ground. A parallel combination of a 150-micro-microfarad capacitor 419 and a 560,000-ohm resistor 420, in series with a 470,000-ohm resistor 421, forms a cross-coupling connection between the control electrode 410 and the anode 414 of the tube 412, while a similar capacitor 422 and resistors 423 and 424 in a like arrangement form a cross-coupling connection between the control electrode 411 and the anode 413. The point of intersection of the resistors 420 and 421 is connected over a 2.2-megohm resistor 425 to the −300-volt terminal 378, and similarly, the point of intersection of the resistors 423 and 424 is connected over a 2.2-megohm resistor 426 to the terminal 378.

The negative pulses at the cathodes 401 and 402 of the left-hand and center diode sections of the tube 400, having wave forms *t* and *s* (FIG. 8B), are fed over the coupling capacitors 408 and 409 to the grids 411 and 410, respectively, of the trigger pair tube 412, and control the two sections of said tube to provide outputs having wave forms *u* and *v* (FIG. 8B) at points *u* and *v* of the circuits of the anodes 414 and 413, respectively.

Point *u* is connected over a 2.2-megohm resistor 427 and a 1-megohm resistor 434 to a −200-volt D.C. terminal 435. A control electrode 428 of the right-hand section of a type 5965 duo-triode tube 429 is coupled to this circuit at point *y* between the resistors 427 and 434. The anode 430 of this section is connected over a 100,000-ohm resistor 431 to the +200-volt terminal 389, while the cathode 432 of this section is connected to a −100-volt terminal 433.

The signal at point *u* of the circuit of the anode 414 of tube 412 is fed over the resistor 427 and point *y* to the control electrode 428 of the right-hand section of the tube 429, the wave shape at point *y* being shown at *y* in FIG. 8B. This signal is inverted and amplified in the right-hand triode section of tube 429 to produce an output signal *z* (FIG. 8B) at point *z* in the circuit of the anode 430. The signal at point *z* is approximately 260 volts in total amplitude and forms the bit input for the language checking circuit, which will subsequently be described. This signal may be applied to the language checking circuit 217 over the path 296, as shown, for example, in FIG. 7, or over the path 296a as shown in FIG. 7A.

Point *v* in the circuit of the anode 413 of the tube 412 is connected over a 1-megohm resistor 436 and a 2.7-megohm resistor 438 to the −100-volt D.C. terminal 433. A control electrode 437 of the left-hand section of the tube 429 is coupled to this circuit at point *w* between the resistors 436 and 438. The anode 439 of the left-hand triode section of tube 429 is connected to the +200-volt terminal 389, while the cathode 440 of said section is connected over a 47,000-ohm resistor 441 to the −200-volt terminal 435. Point *w* in the circuit of the control electrode 437 is also connected over a lead 442 to the anode 443 of the right-hand triode section of the triple diode tube 400. The cathode 444 of said section is connected to a +50-volt terminal 445.

The left-hand triode section of the tube 429 provides the data bit output from a lead 446 connected at point *x* to the circuit of the cathode 440 of said left-hand triode section. The signal at point *v* on the circuit of the anode 413 of the tube 412 is fed over the resistor 436 and through point *w* to the control electrode 437 of the left-hand section of tube 429. The signal at point *w* is shown at *w* in FIG. 8B. The negative voltage swing of the data bit output signal, which is shown at *x* in FIG. 8B, is determined by the resistor network comprising resistors 415, 436, and 438, while the positive voltage swing is controlled through the right-hand diode section of the tube 400, which has its cathode 444 connected to a potential of +50 volts at the terminal 445. This means that the control electrode 437 of the output cathode follower can never swing above +50 volts. The data bit output signal *x* may be carried from point *x* over the lead 446, corresponding to the path 295 of FIG. 7 or the path 295*a* of FIG. 7A, to a utilizing device, as has been described in the earlier description of the overall operation of the machine.

*Language Checking Circuit*

The means for checking for a coincidence of two data signals from the data reading circuits is shown in FIG. 11 and will now be described. As has been stated in the General Description, an error signal is developed by this means in the event that either more or less than two data signals are developed simultaneously by the data reading circuits.

As has been set forth in the description of the data reading circuit of FIG. 10, the output signal *z* of that circuit for each digit channel is applied to the language checking circuit for checking the corrections of the reading process. The signals z are applied to the language checking circuit over a plurality of 680,000-ohm resistors 471 (FIG. 11), one for each data channel, which form a resistor signal-mixing circuit.

This mixed signal, which may be composed of a data bit signal from each of the data reading channels, is fed over 1-megohm resistors 472 and 473 to the control electrodes 474 and 475 of the two triode sections of a type 5965 duo-triode tube 476. When no bit signals are impressed on the circuit, the voltage on the electrodes 474 and 475 is approximately −60 volts. The voltage produced at these electrodes by the addition of each bit is approximately 40 volts for each bit of a six-bit code, such as is used in the illustrative embodiment of the invention.

The anode 477 of the left triode of tube 476 is connected over 100,000-ohm resistor 479 and lead 481 to a +200-volt D.C. terminal 482, and is also connected over resistors 496 and 497, of 820,000 ohms and 2.7 megohms, respectively, and lead 498 to a −300-volt D.C. terminal 499. When the left triode of the tube 476 is not conducting, the anode will be at about +186 volts, which voltage will become less positive when this triode conducts. Similarly, the anode 478 of the right triode of tube 476 is connected over a 100,000-ohm resistor 480 and the lead 481 to the +200-volt terminal 482 and is connected over resistors 509, 510, and 511, of 1 megohm, 2.2 megohms, and 200,000 ohms, respectively, and the lead 498 to the −300-volt D.C. terminal 499. When the right triode of the tube 476 is not conducting, the anode 478 will be at about +186 volts, which voltage will become less positive when this triode conducts.

Potential which is supplied to the cathodes 483 and 484 of the tube 476 is controlled by two sections of a type 5965 duo-triode tube 485. The tube 485 has its anodes connected over lead 481 to the +200-volt D.C. terminal 482 and has its cathodes connected over 15,000-ohm resistors 486 and 487 and lead 488 to the −100-volt D.C. terminal 489. The control electrode of the left-hand section is supplied with potential of about zero volts from a potential divider consisting of resistors 490 and 491, of 220,000 ohms and 110,000 ohms, respectively, connected between the leads 481 and 488. The control electrode of the right section is supplied with potential of about +43 volts from a potential divider consisting of resistors 492 and 493, of 220,000 ohms and 200,000 ohms, respectively, connected between the leads 481 and 488. The potentials thus applied to the control electrodes will cause the cathode of the left section of the tube 485 to be at slightly negative potential and the cathode of the right section to be about 43 volts more positive than that of the left section.

Since the cathodes 483 and 484 of the tube 476 are connected by leads 494 and 495 to the cathodes of the left and right sections, respectively, of tube 485, they will be at the same potential as those cathodes. The potentials thus applied to the cathodes 483 and 484 will bear such a relation to the potentials of their related control electrodes that the triodes will normally be biased to non-conduction, but the left section can be made to conduct when two data bit signals are simultaneously applied to the mixer network, and the right section can be made to conduct only when three or more data bit signals are simultaneously applied to the mixer network.

The left section of the tube 476 controls conduction in a signal-inverting tube 501. The control electrode 500 of the triode 501, which may be one half of a type 5965 tube, is connected between the resistors 496 and 497 in the anode circuit of the left section of the tube 476. The anode 502 of the tube 501 is connected over a 100,000-ohm resistor 503 and the lead 481 to the +200-volt D.C. terminal 482, and is also connected over a 680,000-ohm resistor 507 and a 2.2-megohm resistor 508 and the lead 498 to a −300-volt D.C. terminal 499. When the tube 501 is not conducting, the anode 502 will be at about +183 volts, which voltage will become less positive when this triode conducts. The cathode 504 of the tube 501 is connected over a lead 505 to a base reference potential which is shown as ground in FIG. 11.

The inverted signal from the tube 501 is applied to a tube 506, which may be of type 5915. The #1 control electrode of the tube 506 is connected between the resistors 507 and 508 in the anode circuit of the tube 501. The tube 506 is also controlled by the output signal of the right-hand triode section of the tube 476, which is fed directly from the anode 478 to the #3 control electrode of the tube 506, which electrode is connected between the resistors 509 and 510 in the anode circuit of the right section of the tube 476. The anode of the tube 506 is connected over a 38,000-ohm, resistor 512 and the lead 481 to the +200-volt D.C. terminal 482, and is also connected over resistors 514 and 515, of 680,000 ohms and 2.2 megohms, respectively, and the lead 498 to the −300-volt D.C. terminal 499. The #2 and #4 control electrodes of the tube 506 are internally connected and then connected over a 10,000-ohm resistor 513 to the +200-volt D.C. terminal 482. The cathode and the #5 control electrode of the tube 506 are connected to the base reference potential shown as ground in FIG. 11 over the lead 505.

The #1 control electrode of a tube 516, which may be of the gaseous type 5663, is connected between the resistors 514 and 515 over a 1-megohm coupling resistor 517. The anode of the tube 516 is connected over a normally closed error reset switch 518, a 47,000-ohm resistor 519, and the lead 481 to the +200-volt D.C. terminal 482, and is also connected over a 680,000-ohm resistor 523 and a 2.2-megohm resistor 525 to the —300-volt D.C. terminal 499. The cathode of the tube 516 is connected over the lead 505 to ground, while the #2 control electrode of the tube 516 is connected over a 1-megohm resistor 520 and a 330,000-ohm resistor 521 to the —300-volt D.C. terminal 499. An additional input carrying the language checking clock signal from point *j* of FIG. 9, over the path 294 of FIG. 7, or the path 294*a* of FIG. 7A, is coupled over a 68,000-ohm resistor 522 to the #2 control electrode circuit of the tube 516 between the resistors 520 and 521.

A circuit extends from between the resistors 523 and 525 in the anode circuit of the tube 516 to the control electrode of the left-hand section of a duo-triode tube 524, which may be of the type 5965. The anode of the left-hand section of the tube 524 is connected over a 100,000-ohm resistor 526 to a +100-volt D.C. terminal 527, and is also connected over a 270,000-ohm resistor 531 and a 2.2-megohm resistor 532 to the —100-volt D.C. terminal 489. When the left triode of the tube 524 is not conducting, its anode will be at about +92 volts, which voltage will become less positive when this triode conducts. The cathode of the left-hand section of the tube 524 is connected to ground.

The anode of the right-hand triode section of the tube 524 is connected to the +200-volt D.C. terminal 482, while the cathode of said right-hand section of the tube 524 is connected over a 560,000-ohm resistor 528 in series with a 39,000-ohm resistor 529 to a —200-volt D.C. terminal 530. The control electrode of the right-hand section of the tube 524 is connected to the anode circuit of the left triode of said tube between the resistors 531 and 532.

The error signal output means 533 for the language checking circuit of FIG. 11 is taken off the cathode circuit of the right-hand section of the tube 524 between the cathode and the resistor 528. This error signal output means may be applied to the utilizing device 213 over the path 297, as shown in FIG. 7, or may be otherwise employed over path 297*a*, as shown in FIG. 7A.

The mode of operation of the language checking circuit of FIG. 11 will now be described. As has been stated, data bit signals from the various data reading circuits are applied over the resistors 471 comprising a resistor signal mixing circuit and over the resistors 472 and 473 to the control electrodes 474 and 475 of the right and left-hand sections of the tube 476. The cathodes 483 and 484 of the tube 476 are supplied with potentials from the two sections of tube 485 of such values relative to the potentials on the control electrodes that the two sections of the tube 476 will be normally non-conducting. As has also been stated, the left-hand section of the tube 476 has its cathode at such a voltage that it will conduct if two or more data bit signals have been applied to the mixing network, while the right-hand section of the tube 476 has its cathode at such a voltage that it will conduct only if three or more data bit signals are present.

Let it first be assumed that less than two data bit signals are applied to the signal mixing network of FIG. 11. In this case, as has been previously described, neither of the two sections of the tube 476 will be rendered conducting. Since no negative-going signal is applied from the anode 477 of the left-hand section of the tube 476 over the resistor 496 to the control electrode 500 of the tube 501, such as would result if said section were rendered conducting by the application to the control electrode 474 of a signal corresponding to two or more data bits, the normal bias on the electrode 500 holds said tube in a conducting condition. The potential of the anode 502 of the tube 501 is therefore approximately +10 volts due to conduction in the tube, and due to the voltage-dividing network comprising resistors 507 and 508, the #1 electrode of the tube 506 remains at a negative value of potential which holds said tube in a non-conducting condition, regardless of the value of the potential on the #3 electrode of the tube 506, which electrode is coupled over the resistor 509 to the anode circuit of the right-hand section of the tube 476, which at this time is non-conducting and is supplying a positive potential to the #3 electrode of the tube 506.

When the tube 506 is cut off, its anode potential goes from slightly above ground to a more positive value. Since tube 506 is now cut off, this higher positive potential value appears on the #1 control electrode of the tube 516, which electrode is coupled to the anode circuit of the tube 506 over the resistors 514 and 517. The positive potential at the #1 electrode of the tube 516 is sufficient to prime said tube for firing, so that when the language check clock signal *j* is applied to the circuit of FIG. 11 over the resistor 522, and thence is applied to the #2 electrode of tube 516 over the resistor 520, the gaseous tube 516 will fire, thus causing a drop in the potential of its anode circuit.

This drop appears over the resistor 523 on the control electrode of the left-hand section of the tube 524 as a negative-going pulse, and causes said left-hand section to be cut off, said section being normally conducting, due to the normal bias on its control electrode. This in turn applies a positive-going signal from the anode circuit of the left-hand section of the tube 524 over the resistor 531 to the control electrode of the right-hand section of the tube 524. Said control electrode is normally biased to cut-off, so that this positive-going signal renders the tube conducting and causes the error signal output at the cathode of the right-hand section of the tube 524 to rise to a +50-volt "true" level for indication of the fact that an error has been detected in the bit outputs from the reader. As has been previously stated, this error output may be applied to the utilizing device to which the reader is coupled, or may be utilized in some other manner.

The error signal output will remain at the +50-volt "true" level until the tube 516 is extinguished, and this may be accomplished by opening the switch 518 in the anode circuit of the tube 516, thereby extinguishing said tube. This causes the potential level of the anode of said tube to rise, and thereby applies a positive-going signal over the resistor 523 to the control electrode of the left-hand section of the tube 524 to render said tube conducting. The resulting drop in anode potential of the left-hand section of the tube 524 causes the control electrode of the right-hand section of the tube 524 to be returned to its normal negative bias, thereby cutting off said right-hand section and dropping the voltage level of the error output signal on the cathode of said section to its negative "false" level.

In a manner similar to that described above, an error signal is also produced by the circuit of FIG. 11 when more than two data bit signals are applied coincidentally to the signal mixing network which includes the resistors 471. In this event, both the right and left-hand sections of the tube 476 will be rendered conducting, in a manner previously described. As has been stated, when the left-hand section of the tube 476 is in a conducting state, a positive normal bias voltage is applied to the #1 electrode of the tube 506, due to the fact that the tube 501 is cut off. However, a negative-going signal is applied to the #3 control electrode of the tube 506, due to the conduction of the right-hand section of the tube 476, and the consequent lowering of the anode potential of said section, which is effective, over the resistor 509, to lower the potential on the #3 control electrode of the tube 506. The #3 control electrode of the tube 506 is therefore effective to hold said tube in a non-conducting condition, which produces a potential level on the anode circuit of the tube 506, and on the #1 control electrode of the gaseous tube 516, sufficiently positive to prime the tube 516 for firing. Therefore, the next language check clock signal *j* applied over the resistors 522 and 520 to the #2 control electrode of the tube 516 will be effective to fire said tube and thereby cause the error signal at the cathode of the right-hand section of the tube 524 to rise to the +50-volt "true" level and thus indicate an error in reading, in the manner previously described. Here again, the error reset switch 518 is effective to extinguish the tube 516 when desired, and thus return the error signal at the cathode of the right-hand section of the tube 524 to its "false" potential level.

Let it now be assumed that exactly two data bits are present, so that no error signal will be produced by the language checking circuit of FIG. 11. In such a case, the left-hand triode section of the tube 476 will be conducting, while the right-hand section of said tube will not.

The resistance network comprising resistors 479, 496, and 497 provides a normal bias on the control electrode 500 of the tube 501 such that said tube is in a normally conducting state. When the left-hand section of the tube 476 is rendered conducting, a negative-going signal is supplied from the circuit of the anode 477 over the resistor 496 to the control electrode 500 of the tube 501, thus rendering said tube non-conducting. When the tube 501 is in a conducting state, its anode 502 is at a potential of approximately +10 volts. During this time, the first control electrode of the tube 506 is held at a negative potential, due to the voltage-dividing network comprising resistors 507 and 508, and said electrode therefore holds the tube 506 in a non-conducting condition. When the tube 501 is rendered non-conducting due to a negative-going signal being applied to its control electrode 500, the anode potential of the tube 501 rises, causing a positive-going signal to be applied to the first control electrode of the tube 506 to permit said tube to conduct. Since the right-hand section of the tube 476 has been stated to be non-conducting at this time, there will be a positive potential on the #3 control electrode of the tube 506, due to its normal bias, which electrode is coupled to the anode circuit of the right-hand section of the tube 476 over the resistor 509, and the tube 506 will therefore be in a conducting condition. So long as the tube 506 conducts, no error signal will be produced by the language checking network of the circuit of FIG. 11, since no positive priming signal will be applied to the #1 control electrode of the tube 516, and the tube will not be fired, and the sections of tube 524 will be ineffective to produce a positive signal on the error output signal means 533 in the manner previously described.

*Brake Operating Circuit*

Figure 12:
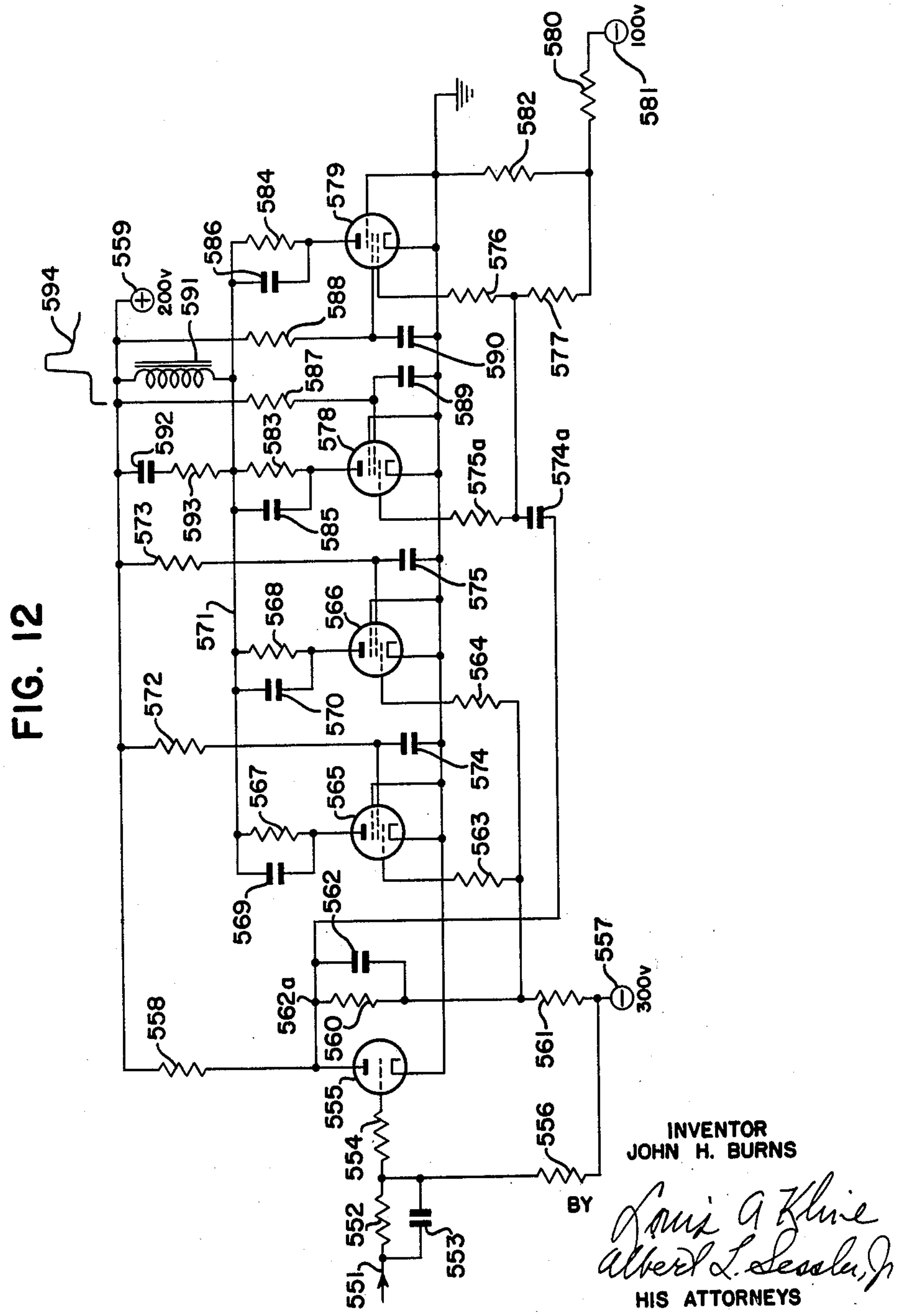
FIG. 12 shows a circuit for operating the high-speed brake employed in the tape-handling apparatus of the present invention.

The circuit for operating the high-speed brake 105 (FIG. 1) will now be described. This circuit is shown in FIG. 12 and is controlled by a signal which may originate in the utilizing device associated with the tape reader and be applied over the path 298 to the brake operating circuit as shown in FIG. 7, or which may be applied to the brake operating circuit from the brake control circuit over the path 299, as shown in FIG. 7A. The control signal is a D.C. signal which, when positive, indicates "read" and thus allows the tape to move, and which, when negative, indicates "stop" and thus halts the tape and keeps it from moving.

In FIG. 12, an input lead 551 to the brake operating circuit provides a path for this control signal. The lead 551 is coupled over a parallel combination of a 100,000-ohm resistor 552 and a 0.01-microfarad capacitor 553 to the junction of two paths. One path extends over a 470,000-ohm isolating resistor 554 to the control electrode of a tube 555, which is shown as a triode, but which alternatively may be of the type 5915, in the event that it is desired to provide an additional control for the brake from some other source, as, for example, during the turn-on operation of the reader. The second path extends over a 1-megohm resistor 556 to a −300-volt D.C. terminal 557.

The cathode of the tube 555 is connected to a base reference potential, shown in FIG. 12 as ground, while the anode of said tube is connected over a 47,000-ohm resistor 558 to a +200-volt D.C. terminal 559, and is also connected over resistors 560 and 561, of 220,000 ohms and 820,000 ohms, respectively, to the −300-volt D.C. terminal 557. When the tube 555 is not conducting, the anode will be at about +178 volts, which voltage will become less positive when this tube conducts. A 0.01-microfarad capacitor 562 is connected in parallel combination with the resistor 560.

At the junction of the resistors 560 and 561, parallel paths are provided over 1-megohm resistors 563 and 564 to the #1 control electrodes of two tubes 565 and 566, which may be of the 6CL6 type. The cathodes of the tubes 565 and 566 are connected to ground, while the anodes of these tubes are connected over parallel combinations of 1,000-ohm resistors 567 and 568, and 0.25-microfarad capacitors 569 and 570, respectively, to a common 571. The #2 control electrodes of the tubes 565 and 566 are connected over 4,700-ohm resistors 572 and 573 to the +200-volt D.C. terminal 559, and are also connected to the base reference potential, ground in FIG. 12, over capacitors 574 and 575. The #3 control electrodes of the tubes 565 and 566 are connected to ground.

A connection extends from a point *562a* in the anode circuit of the tube 555 over a 0.01-microfarad capacitor *574a* to the junction of a first 1-megohm resistor *575a*, a second 1-megohm resistor 576, and a third 1-megohm resistor 577. The resistors *575a* and 576 are connected at their other ends to the #1 control electrodes of two tubes 578 and 579, which may be of the 6CL6 type. The resistor 577 is connected over a 10,000-ohm resistor 580 to a −100-volt D.C. terminal 581. The junction of the resistors 577 and 580 is connected to ground over a 22,000-ohm resistor 582. The cathodes of the tubes 578 and 579 are connected to ground, as shown in FIG. 12, while the anodes of these tubes are connected over parallel combinations of 100,000-ohm resistors 583 and 584 and 0.025-microfarad capacitors 585 and 586 to the common 571. The #2 control electrodes of the tubes 578 and 579 are connected over 4,700-ohm resistors 587 and 588 to the +200-volt D.C. terminal 559, and are also connected to ground over 0.1-microfarad capacitors 589 and 590, respectively. The #3 control electrodes of the tubes 578 and 579 are connected to ground.

A brake coil 591, which may consist of two coils of 1,500 turns each of #33 wire, is connected between the +200-volt D.C. terminal 559 and the common 571. In parallel with the coil 591 and connected between the terminal 559 and the common 571 is a series combination of a 0.001-microfarad capacitor 592 and a 1,000-ohm resistor 593.

The mode of operation of the brake operating circuit of FIG. 12 will now be described. As has been stated, the input signal on lead 551 from the utilizing device may be either positive, in which event the tape will be permitted to move, or negative, in which event the brake 105 (FIG. 1) will be operated to grip the tape to keep it from moving.

Let it be assumed that the utilizing device has produced a negative signal on the lead 551 to stop the tape. This signal, in combination with the normal biasing voltage applied to the control electrode of the tube 555 from the terminal 557 over the resistor 556, and over the isolating resistor 554, will cause the tube 555 to assume a non-conducting condition. The capacitor 553 in parallel with the resistor 552 permits extremely rapid application of the signal from the lead 551 over the resistor 554 to the control electrode of the tube 555 to cut off said tube.

When the tube 555 is cut off, a positive-going signal is produced on its anode circuit and is effective to cause conduction in tubes 565, 566, 578, and 579, in a manner which will now be described. The positive-going signal at the anode of the tube 555 is applied over the parallel combination of the resistor 560 and the capacitor 562 and over the resistors 563 and 564 to the #1 control electrodes of the tubes 565 and 566. These tubes are normally in a non-conducting condition due to the negative bias applied to their #1 control electrodes from the terminal 557, but the positive-going signal applied to said control electrodes is sufficient to overcome the negative bias and render the tubes conducting.

Simultaneously, the positive-going signal at the anode of the tube 555 is applied over the capacitor *574a* and the resistors *575a* and 576 to the #1 control electrodes of the tubes 578 and 579. These tubes are also normally in a non-conducting condition, due to the negative bias applied to their #1 control electrodes from the terminal 581, but the positive-going signal applied to said control electrodes here also is sufficient to overcome the negative bias and render these tubes conducting. Since the tubes 578 and 579 are A.C.-coupled to the tube 555 over the capacitor *574a*, they will be rendered conducting for only a short time, and then will be cut off again as the capacitor *574a* charges. Thus it will be seen that all four of the tubes 565, 566, 578, and 579 will be rendered conducting by a negative pulse on the lead 551, but that the tubes 578 and 579 will shortly thereafter be cut off again as the capacitor *574a* charges.

As has been previously described, the anode circuits of the tubes 565, 566, 578, and 579 are connected over identical parallel combinations of capacitors and resistors to the common 571, and the brake coil 591 in turn is connected between the +200-volt D.C. terminal 559 and the common 571. Consequently, when said tubes are rendered conducting, a circuit is completed through the tubes for energizing the brake coil 591 to operate the brake 105 (FIG. 1). The tubes 565 and 566, which are D.C.-coupled to the tube 555, supply about 50 milliamperes each to the brake coil 591. Since a greater force is required initially to operate the brake 105 than to maintain it in operated condition, additional current to be furnished to the brake coil 591 for a brief period, by conduction of the tubes 578 and 579, is desirable. The tubes 578 and 579, which are A.C.-coupled to the tube 555, and which are rendered conducting for a short time and then are cut off again as the capacitor 574 charges, provide this momentary additional current for energization of the coil 591. The combined effect of the four tubes 565, 566, 578, and 579 upon the brake current can be seen in the wave form shown at 594 in FIG. 12. In the described embodiment, considering the wave form from left to right, the current peak rises to near 200 milliamperes and then falls to a steady state of about 100 milliamperes. With the circuits as described, the current rise time is approximately one-tenth of one millisecond.

The series combination of the capacitor 592 and the resistor 593, which is connected in parallel with the brake coil 591 between the terminal 559 and the common 571, serves to dissipate the inductive effect provided by deenergization of the coil 591 when the tubes 565 and 566 are rendered non-conducting.

As has been described above, when a negative-going signal is applied to the lead 551 of FIG. 12 from the utilizing device 213, the brake coil 591 is energized under control of the brake operating circuit, and the brake 105 (FIG. 1) is thereby caused to halt movement of the tape and to hold said tape against further movement until a positive-going signal is applied to the lead 551 from the utilizing device 213. Upon the application of a positive-going signal to the lead 551, the potential on the control electrode of the tube 555 is made positive, and said tube is thereby made to conduct. Since the cathode of the tube 555 is grounded, when said tube conducts, the anode thereof will drop in potential to a value slightly above ground, thereby causing a negative-going signal to be applied over the previously described paths to the #1 control electrodes of the tubes 565, 566, 578, and 579. The tubes 565 and 566, which are conducting at this time, will thereby be cut off, and the brake coil 591 will be deenergized due to the interruption of its current supply circuit through these tubes. As has been described, the inductive reaction due to the deenergization of the brake coil 591 will be dissipated over the circuit which includes the capacitor 592 and the resistor 593.

It is thus seen that the brake operating circuit of FIG. 12 provides means to cause the brake 105 to operate to halt the tape and to release the brake 105 to permit the tape to resume its travel past the reading station 106 (FIG. 5).

*Brake Control Circuit*

As was stated in the description of the brake operating circuit of FIG. 12, various means may be provided for supplying controlling potentials to the input lead 551 of FIG. 12. One such means may be provided in the utilizing device to enable the tape feed and entry of data to be controlled as required by the utilizing device, in the manner shown in FIG. 7.

Another means, utilizing data signals on the tape, also may supply these control signals to the brake operating circuit, as shown in FIG. 7A. One such means is shown in the circuit of FIG. 13, which utilizes a particular code combination of perforations, known as an end-of-frame signal or end-of-information signal, to generate a tape control signal which will cause the tape to be passed through the reading station intermittently. The present circuit also provides means for causing the tape reader to lock up by continuous application of the brake in the event of an over-feed of the tape, so that the perforations on the tape comprising the code combination referred to above have skidded past the reading station due to the tape motion not being properly stopped by the brake.

As shown in FIG. 7A, the output signals *x* from two predetermined data reading channels 206 and 207 are applied over paths 298 to the brake control circuit 230. These signals are applied to the left-hand and center cathodes of a triple diode 601 (FIG. 13), which may be of the type 6BJ7. The corresponding anodes of the tube 601 are connected to a common point 602 and then over a 470,000-ohm resistor 603 to a lead 604, which extends to a +200-volt D.C. terminal 605. The point 602 is also connected over a parallel combination of a 0.001-microfarad capacitor 606 and a 100,000-ohm resistor 607, connected in series with a 1-megohm resistor 608, to a lead 609 extending to a —300-volt D.C. terminal 610. Coupled to this circuit between the resistors 607 and 608, over a 470,000-ohm resistor 611, is the control electrode of the left-hand section of a duo-triode tube 612, which may be of type 5965. The anode of this triode section is connected over a point 613 and a 100,000-ohm resistor 614 to the +200-volt lead 604 and is also connected over the point 613, the parallel combination of a 0.001-microfarad capacitor 615 and a 220,000-ohm resistor 616, a point 617, and an 820,000-ohm resistor 618 to the —300-volt lead 609. The cathode of the left-hand triode section of the tube 612 is connected to a ground lead 619.

It will be seen that when two data bit signals are applied to the left-hand and center cathodes of the tube 601, the potential at point 602 will be about +50 volts, while if no signal, or only one signal, is applied to these cathodes, the potential at point 602 will be approximately ground, since it will be recalled that the data bit signals swing between zero and +50 volts. Therefore, when data bit signals are simultaneously applied to these two cathodes, a positive-going signal will be produced on point 602 and will be fed over the parallel combination of the speed-up capacitor 606 and the resistor 607, and the resistor 611, to the control electrode of the left-hand section of the tube 612, which section is normally in a non-conducting condition. This section, which serves as an inverter, is rendered conducting by the positive-going signal on its control electrode and causes a negative-going signal to be fed from point 613 on its anode circuit over the parallel combination of the speed-up capacitor 615 and the resistor 616 to the point 617. From the point 617, the negative-going signal is applied simultaneously over 470,000-ohm resistors 620 and 621 to the control electrode of the left-hand section of a duo-triode tube 622 and to the control electrode of the right-hand section of a duo-triode tube 623, respectively, both of said tubes being of type 5965.

Considering first the left-hand section of the tube 622, the anode of this section is connected over a 47,000-ohm resistor 624 to the +200-volt lead 604, while the cathode is connected to the ground lead 619. This section is normally conducting and serves as a signal inverter, a positive-going signal being produced on its anode when the section is cut off by the negative signal on its control electrode.

The anode circuit of the left-hand section of the tube 622 is A.C. coupled over a 100-micro-microfarad capacitor 625, a point 626, and a 470,000-ohm resistor 627 to the right-hand triode section of the tube 622. The point 626 is connected over a 1-meghom resistor 628 to a —200-volt D.C. terminal 629, and is also connected over a 100,000-ohm resistor 630 to the ground lead 619. The capacitor 625, together with the resistors 624, 628, and 630, forms a differentiating network which transforms the positive-going signal on the anode of the left-hand section of the tube 622 to a positive pulse which is applied over the resistor 627 to the control electrode of the right-hand section of the tube 622. This section, which has its anode connected over a 100,000-ohm resistor 631 to the +200-volt lead 604, and which has its cathode connected to the ground lead 619, is normally non-conducting. The positive pulse at its control electrode causes it to conduct momentarily, thus producing a negative pulse at its anode.

The negative pulse on the anode of the right-hand section of the tube 622 is applied over a 100-micro-microfarad capacitor 632 in a lead 633 to the control electrode of the left-hand section of the duo-triode tube 634, which may be of the type 5965. The anode of this section is connected over a point 635 and over a 100,000-ohm resistor 636 to the +200-volt lead 604, and is also connected over the point 635, a parallel combination of a 560,000-ohm resistor 637 and a 1,000-micro-microfarad capacitor 638, a point 639, and a 2.2-megohm resistor 640 to the —300-volt lead 609. The cathode of this section is connected to the ground lead 619. The anode of the right-hand section of the tube 634 is connected over a point 641 and a 100,000-ohm resistor 642 to the +200-volt lead 604, and is also connected over the point 641, a parallel combination of a 560,000-ohm resistor 643 and a 1,000-micro-microfarad capacitor 644, a point 645, and a 2.2-megohm resistor 646 to the —300-volt lead 609. The cathode of the right-hand section of the tube 634 is connected to the ground lead 619.

The two sections of the tube 634 function as a flip-flop or trigger pair, the anode circuit of the left-hand section being connected from point 639 over a 470,000-ohm resistor 647 to the control electrode of the right-hand section, and the anode circuit of the right-hand section of said tube being connected from point 645 over a 470,000-ohm resistor 648 to the control electrode of the left-hand section. The left-hand section of the tube 634 is normally conducting, so that it will be seen that the negative pulse applied to the control electrode of said section over the capacitor 632 will turn said section off and will simultaneously render the right-hand section of the tube 634 conducting.

A negative pulse produced on the anode circuit of the right-hand section of the tube 634 by virtue of its having been rendered conducting is applied over the point 641, a 1-megohm resistor 649, and a point 650 to the control electrode of the right-hand section of the duo-triode tube 612, which may be of the type 5965. The anode of this section is connected to the +200-volt lead 604, while the cathode of this section is connected over a point 651 and a 47,000-ohm resistor 652 to the —200-volt D.C. terminal 629.

The right-hand section of the tube 612 is normally conducting, and continues to conduct, though at a reduced rate, when the negative pulse is applied to its control electrode from the anode circuit of the right-hand section of the tube 634. The right-hand section of the tube 612 functions as a cathode follower, so that the negative signal at its control electrode is essentially duplicated on the cathode. This negative signal is applied over the point 651 and a lead 652*a* to the brake operating circuit of FIG. 12, where the comparable input lead is shown at 551, for energization of the coil 591 and consequent operation of the brake 105. This path is shown at 299 in FIG. 7A. A switch 653 is placed in the lead 652*a*, so that the brake control circuit of FIG. 13 may be rendered incapable of controlling the brake operating circuit of FIG. 12 when it is desired to control the circuit of FIG. 12 from the utilizing device, in the manner shown in FIG. 7, rather than from the circuit of FIG. 13.

Returning now to the right-hand section of the tube 623, the anode of this section is connected over a point 661 and a 100,000-ohm resistor 662 to the +200-volt lead 604, and is also connected over the point 661, a 220,000-ohm resistor 663, a point 664, a switch 665, and an 820,000-ohm resistor 666 to the —300-volt lead 609. The cathode of the right-hand section of the tube 623 is connected to the ground lead 619.

The right-hand section of the tube 623 functions as a bias control for a gaseous tube 667, which may be of the type 5663, and exercises its control over the the tube 667 by means of a connection from point 664 on the anode circuit of this section of the tube 623 over a 1-megohm resistor 668 to the #1 control electrode of the tube 667.

Since the right-hand section of the tube 623 is normally conducting, its anode potential will be only slightly above ground, and the potential applied from point 664 on its anode circuit to the #1 control electrode of the tube 667 will be sufficiently negative to keep the tube 667 from firing. However, when a negative-going signal is applied over point 617 and the resistor 621 to the control electrode of the right-hand section of the tube 623, said tube is rendered non-conducting, and the previously-mentioned negative bias voltage is removed from the #1 control electrode of the tube 667. The tube 667 is now capable of firing if a sufficiently positive potential is applied to its anode.

It may be noted at this point that, if the brake has not been effective to immediately stop the tape, so that the perforations corresponding to the selected data channels, whose signals are applied to the left-hand and center cathodes of the tube 601, have moved or skidded beyond the reading position, the negative-going signal on point 617 will be terminated. This will cause the right-hand section of the tube 623 to become conducting once more, and will re-apply the control bias to the #1 electrode of the tube 667 to keep said tube from firing.

The negative-going signal which was produced on the anode of the right-hand section of the flip-flop tube 634 by its being rendered conductive, as previously described, is applied over the resistor 649, the point 650, a lead 669*a*, a 270,000-ohm resistor 669, and a point 670 to the control electrode of the left-hand section of the tube 623. The point 670 is also connected over a 2.7-megohm resistor 671 to the —300-volt lead 609. The anode of the left-hand section of the tube 623 is connected over a point 672, a point 673, a variable resistance 674, rated at 1 megohm, and a 47,000-ohm resistor 675 to the +200-volt lead 604. The cathode of the left-hand section of the tube 623 is connected to the ground lead 619.

The negative-going signal from the anode of the right-hand section of the tube 634 which was applied to the control electrode of the left-hand section of the tube 623 causes said section to be cut off. The output potential on the anode of said section is thereby caused to swing positively from the approximately ground potential to which it was held during the conduction of said section, thereby raising the potential at points 672 and 673.

Referring to the tube 667, it will be seen that the anode of said tube is connected to the point 673, the cathode is connected over a 1,000-ohm resistor 676 to ground, and the #2 control electrode is connected to a point 677 between a 330,000-ohm resistor 678, extending to the —300-volt lead 609, and a 1,500-ohm resistor 679, extending to the ground lead 619.

Since, as has been described, the conduction path for the anode of the left-hand section of the tube 623 extends through the point 673, to which the anode of the tube 667 is connected, the anode of the tube 667 is clamped at approximately ground potential during conduction of the left-hand section of the tube 623. Therefore, cutting off of the left-hand section of the tube 623 removes the clamp on the anode of the tube 667.

It will be noted that the point 672 in the anode circuit of the left-hand section of the tube 623 is also clamped at approximately ground potential during conduction of said tube. This point 672 is connected over a 47,000-ohm resistor 679 to a switch 680, which may be selectively positioned in electrical contact with one side of any one of a plurality of capacitors 681 to 685 inclusive, the other sides of which are connected to the ground lead 619. The capacitors 681 to 685, inclusive, are each of a different value of capacitance, in this case the values being 100 micro-microfarad, 0.001 microfarad, 0.01 microfarad, 0.1 microfarad, and 0.25 microfarad, respectively. However, it will readily be seen that any desired series of values, compatible with the requirements of the circuitry, may be employed in place of the values recited.

The tube 667 and its associated components constitute a relaxation oscillator in which the variable resistor 674 is the resistance, and the capacitance is selected from among the available capacitors 681 to 685, inclusive, by positioning of the switch 680. Since both the resistance and the capacitance may be varied, it is possible to vary the period of oscillation of the circuit. When the clamp on points 672 and 673 is removed by cutting off the left-hand section of the tube 623, the selected capacitor, shown in FIG. 13 as 682, begins to charge through the variable resistance 674, and the potential at point 673 begins to rise. When the potential at point 673 reaches the firing potential required for the tube 667, said tube will fire, discharging the capacitor 682 and causing a sharp drop in the anode potential of the tube. The time at which the tube 667 will fire is, of course, determined by the RC time of the network, and by the tube characteristics of the tube 667. The negative excursion of potential on the anode of the tube 667 is applied over a 150-micro-micro-farad capacitor 686 to the control electrode of the right-hand section of the flip-flop tube 634, rendering said section non-conducting, and switching the flip-flop back to its original condition. The resulting positive pulse on the anode of the right-hand section of the tube 634 is applied over the point 641, the resistor 649, and the point 650 to the control electrode of the right-hand section of the tube 612. It will be recalled that this tube functions as a cathode follower, the brake control signal for the brake operating circuit of FIG. 12 being transmitted to the operating circuit over the lead 652*a* if the switch 653 is closed. Therefore, the aforementioned positive excursion appearing on the control electrode of the right-hand section of the tube 612 causes a corresponding positive excursion of cathode potential, which signal may be applied over the lead 652*a* to the brake operating circuit shown in FIG. 12 to release the brake and permit further tape movement. The maximum positive potential level of the brake operating signal on the lead 652*a* is limited to +50 volts, since the point 650 is clamped at +50 volts by its connection to the anode of the right-hand section of the triple diode tube 601, the clamping cathode being connected to a +50-volt terminal 687.

The same positive-going signal that is applied over the point 650 to the control electrode of the right-hand section of the tube 612 to deenergize the brake is applied over the lead 669*a*, the resistor 669, and the point 670 to the control electrode of the left-hand section of the tube 623, thereby rendering said tube conducting once more, and restoring the clamp to points 672 and 673. This renders the tube 667 non-conducting and prevents further operation of the relaxation oscillator described previously.

As has been mentioned previously, in the event that the motion of the tape is not stopped by the brake before the perforations corresponding to the selected data channels move out of reading position, the right-hand section of the tube 623 will resume its normal conducting condition, and the bias control on the #1 electrode of the tube 667 will thereby be re-established and will prevent said tube from firing. In this event, the circuit of FIG. 13 will hold the brake in an energized condition, since the flip-flop tube 634 will not be reset to its initial condition to apply a positive signal on the lead 652*a*. The switch 665 is provided to enable the brake to be deenergized in this situation. Operation of the switch 665 will remove the negative bias from the #1 electrode of the tube 667, thus permitting said tube to fire and thereby causing the flip-flop tube to be reset and a positive signal to be applied on the lead 652*a* for deenergization of the brake. Similarly, it may be necessary, when initially conditioning the circuit of FIG. 13 for operation, to operate the switch 665 to place the flip-flop tube 634 in proper initial condition, in which the left-hand section of said tube is conducting and the right-hand section is cut off.

SUMMARY

It will thus be seen that a tape-handling apparatus has been provided which is capable of rapidly, efficiently, and economically reading information-bearing tape. Means have been provided for retiming the data received from the tape to facilitate its assimilation by a utilizing device, and additional means have been shown for checking the accuracy of the information read, and for stopping the tape and subsequently permitting its further movement, either in response to commands from the utilizing device, or according to an adjustable time delay.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. Record tap handling apparatus comprising, in combination, a supporting pathway along which a record tape having a plurality of data channels and a clock channel is adapted to be moved; driving means for moving said tape with respect to said pathway; a reading station located adjacent said pathway and comprising a plurality of data sensing means, each adapted for scanning one of said channels to provide data signals from each channel in accordance with the data recorded thereon; further sensing means for scanning the clock channel on said record tape to provide a plurality of timed clock signals; means for applying one of said clock signals to the data sensing means along with any input signals thereto to re-time said input signals to a common instant as determined by the clock signal; output paths for the re-timed data signals; a checking circuit for checking the number of data signals produced coincidentally at any time; means for applying a further one of said clock signals to said checking circuit; and means for applying the data signals from each of said channels to said checking circuit, said checking circuit being operable to produce an error signal in the event of reading of a simultaneous number of data signals, which number is other than that required by the predetermined code being read.

2. Record tape handling apparatus comprising, in combination, a supporting pathway along which a record tape having a plurality of data channels and a clock channel is adapted to be moved; driving means for moving said tape with respect to said pathway; a reading station located adjacent said pathway and comprising a plurality of data sensing means, each adapted for scanning one of said channels to provide data signals from each channel in accordance with the data recorded thereon; further sensing means for scanning the clock channel on said record tape to provide a plurality of timed clock signals; checking means for checking the number of data signals produced coincidentally at any time; means for applying a clock signal and data signals from each of said data channels to said checking means, said checking means being capable of producing an error signal in the event that an incorrect number of data signals and a clock signal are simultaneously applied thereto; and inhibiting means effective to inhibit the initial clock signal at the commencement of each operation of the tape-handling apparatus, so that an error signal cannot be produced by the checking means at that time.

3. Record tape-handling apparatus comprising, in combination, a supporting pathway along which a record tape having a clock channel comprising a series of regularly-spaced traces is adapted to be moved; driving means for moving said tape with respect to said pathway; sensing means for scanning the clock channel on said record tape; clock signal means associated with said sensing means for developing a plurality of clock signals from every clock trace scanned by said sensing means; and inhibiting means for inhibiting certain of the clock signals developed from the first trace scanned in each operation of the record tape-handling apparatus.

4. The apparatus of claim 3, also including means controlled by the first trace of the clock channel for rendering the inhibiting means ineffective to inhibit clock signals derived from the second and subsequent traces of the clock channel.

5. The apparatus of claim 4, also including reset means for resetting the inhibiting means to effective condition.

6. Record tape handling apparatus comprising, in combination, a supporting pathway along which a record tape having a plurality of data channels and a clock channel is adapted to be moved; yieldable driving means for moving said tape with respect to said pathway; braking means for halting movement of the tape; a reading station located adjacent said pathway and comprising a plurality of data sensing means, each adapted for scanning one of said channels to provide data signals from each channel in accordance with the data recorded thereon, further sensing means for scanning the clock channel on said record tape to provide at least one clock signal; means for applying said clock signal to the data sensing means along with any input signals thereto to re-time said data signals to a common instant as determined by the clock signal; and brake control means responsive to a certain predetermined combination of at least two coincident re-timed data signals produced from the various data channels for operation of the braking means to halt movement of the record tape.

7. The apparatus of claim 6, also including time-delay means associated with the brake control means for holding said brake in operated condition for a predetermined period of time and subsequently releasing said brake.

8. The apparatus of claim 7 including means for selectively altering the period of time during which the brake remains in operated condition.

9. The apparatus of claim 7 and also including means to prevent release of the brake in the event that the brake has operated improperly.

10. The apparatus of claim 7 in which the time delay means includes a relaxation oscillator.

11. The apparatus of claim 9, further including manually operable brake release means.

12. Apparatus for producing timing signals derived from a record medium comprising, in combination, means for deriving a uniform clock wave from the record medium; means for producing a first timing signal from the clock wave; means for producing at least one further timing signal from the clock wave; means for producing a control signal from the clock wave; a bi-stable device capable of assuming either a conducting or a non-conducting condition, and being in a non-conducting condition at the beginning of each operation of the apparatus, said bi-stable device changing from non-conducting to conducting condition in response to application of the control signal thereto; means to apply the control signal to the bi-stable device; and clamping means controlled by said bi-stable device and effective to inhibit production of said further timing signal when said bi-stable device is in non-conducting condition, said further timing signal therefore being inhibited at the beginning of each operation of the apparatus, said clamping means being thereafter rendered ineffective by said control signal to inhibit production of said further timing signal.

13. The apparatus of claim 12, also including means to reset the bi-stable device from conducting to non-conducting condition at the end of an operation of the apparatus to condition the apparatus for the beginning of the next operation.

14. Apparatus for producing timing signals derived from a record medium comprising, in combination, means for deriving a uniform clock wave from the record medium; means for producing a first timing signal from each cycle of the clock wave for controlling a first device; means for producing at least one further timing signal from each cycle of the clock wave for controlling a further device; means for producing a control signal from the clock wave; a memory device capable of changing condition in response to application of the control signal thereto; and clamping means controlled by said memory device and capable of inhibiting production of said further timing signal.

15. Apparatus for producing timing signals from a record medium comprising, in combination, means for deriving a uniform clock wave from the record medium; means for producing a plurality of timing signals from each cycle of the clock wave; inhibiting means effective to inhibit certain of the timing signals at the beginning of an operation of the apparatus; and means controlled by the clock wave for rendering the inhibiting means ineffective.

16. The apparatus of claim 15, also including manually operable reset means for resetting the inhibiting means to effective condition.

17. A control device comprising, in combination, signal input means; a bi-stable element; output signal means capable of producing an output signal which changes from one state to another, said output signal means associated with the bi-stable element; means for applying a signal derived from an input signal on the input signal means to said bi-stable element to trigger said bi-stable element, thus producing a change of state in an output signal on the output signal means; a first signal-translating device which is normally in conducting condition; a second signal-translating device; means associated with said first signal-translating device for clamping said second signal-translating device in non-conducting condition; means responsive to application of an input signal to the signal input means for priming said second signal-translating device for conduction; further means responsive to application of an input signal to the signal input means to render said first signal-translating device non-conducting and thus remove the clamp on said second signal-translating device, thereby causing said second signal-translating device to conduct; an impedance associated with said second signal-translating device and effective after a predetermined time delay to render said second signal-translating device non-conducting after said second signal-translating device has been rendered conducting by application of an input signal to the signal input means; and means controlled by the condition of said second signal-translating device and effective to trigger said bi-stable element when said second signal-translating device is rendered non-conducting, to thereby cause the output signal on the output signal means to revert to its original state.

18. The control device of claim 17 including means for selectively altering the period of time during which the second signal-translating device remains energized.

19. The control device of claim 17 and also including means to prevent conduction of the second signal-translating device in the event that the input signal is terminated prematurely.

20. The control device of claim 17, further including manually operable means to cause conduction of the second signal translating device.

21. A control device for producing an output signal of given duration comprising, in combination, signal input means; a signal output means for producing an output signal; bi-stable means for controlling the signal output means; means responsive to a signal from the signal input means for triggering the bi-stable means to thereby produce an output signal; resetting means including a gaseous discharge device for triggering the bi-stable means to terminate the output signal; and selectively variable timing means responsive to a signal from the signal input means and capable of controlling conduction in the resetting means to thereby terminate the output signal after a predetermined period of time.

22. A control device comprising, in combination, signal input means; signal output means for producing an output signal which is in one of two conditions; bi-stable means for controlling the signal output means to determine the condition of said output signal; means responsive to a signal from the signal input means for triggering the bi-stable means to change the output signal from one of said conditions to the other; resetting means for operating said bi-stable means to return the output signal to its original condition after a predetermined period of time; and timing means for operation of the resetting means, and including a variable resistance and a variable capacitance which may be selectively adjusted to vary the time period for return of the output signal to its original condition.

References Cited in the file of this patent

UNITED STATES PATENTS

| | | |
|---|---|---|
| 2,682,573 | Hunt | June 29, 1954 |
| 2,780,670 | Brewster | Feb. 5, 1957 |
| 2,793,344 | Reynolds | May 21, 1957 |
| 2,817,829 | Lubkin | Dec. 24, 1957 |
| 2,834,923 | England | May 13, 1958 |
| 2,837,732 | Nelson | June 3, 1958 |
| 2,845,610 | Cornell et al. | July 29, 1958 |
| 2,855,584 | McCarroll et al. | Oct. 7, 1958 |
| 2,863,101 | Churchill | Dec. 2, 1958 |
| 2,870,430 | Hancock | Jan. 20, 1959 |
| 2,874,633 | Goldberg et al. | Feb. 24, 1959 |
| 2,884,487 | Young | Apr. 28, 1959 |
| 2,895,123 | Foster et al. | July 14, 1959 |
| 2,900,132 | Burns | Aug. 18, 1959 |
| 2,907,005 | Kun Li Chien et al. | Sept. 29, 1959 |
| 2,907,989 | Guerber | Oct. 6, 1959 |
| 2,909,337 | Lahti et al. | Oct. 20, 1959 |
| 2,918,662 | Cox et al. | Dec. 22, 1959 |
| 2,948,884 | Guerber et al. | Aug. 9, 1960 |

FOREIGN PATENTS

| | | |
|---|---|---|
| 749,836 | Great Britain | June 6, 1956 |